(12) United States Patent
Niguma et al.

(10) Patent No.: US 8,013,055 B2
(45) Date of Patent: Sep. 6, 2011

(54) AQUEOUS ORGANIC-INORGANIC HYBRID COMPOSITION

(75) Inventors: Tatsuro Niguma, Tokyo (JP); Hiroaki Takanohashi, Tokyo (JP); Akira Nakabayashi, Tokyo (JP)

(73) Assignees: Asahi Kasei Chemicals Corporation, Tokyo (JP); Asahi Kasei E-Materials Corporation, Tokyo (JP)

( * ) Notice: Subject to any disclaimer, the term of this patent is extended or adjusted under 35 U.S.C. 154(b) by 359 days.

(21) Appl. No.: 12/097,214

(22) PCT Filed: Dec. 12, 2006

(86) PCT No.: PCT/JP2006/324745
§ 371 (c)(1),
(2), (4) Date: Jun. 12, 2008

(87) PCT Pub. No.: WO2007/069596
PCT Pub. Date: Jun. 21, 2007

(65) Prior Publication Data
US 2009/0286068 A1    Nov. 19, 2009

(30) Foreign Application Priority Data
Dec. 13, 2005    (JP) .................................. 2005-359091

(51) Int. Cl.
C08K 3/22    (2006.01)
C08K 9/06    (2006.01)
C08L 83/00    (2006.01)
C08L 83/04    (2006.01)
C08L 83/08    (2006.01)

(52) U.S. Cl. ........ 524/588; 523/201; 523/212; 523/220; 524/430; 524/779; 977/775; 977/777; 977/778

(58) Field of Classification Search ................. 428/327; 523/200, 201, 202, 203, 205, 207, 209, 212, 523/220; 524/430, 431, 432, 433, 588, 779; 977/772, 775, 777, 778
See application file for complete search history.

(56) References Cited

U.S. PATENT DOCUMENTS

| 6,048,910 A * | 4/2000 | Furuya et al. ................... 522/86 |
| 6,726,997 B2 * | 4/2004 | Tamori et al. ................. 428/447 |
| 7,030,058 B1 * | 4/2006 | Nakabayashi ................ 502/401 |

FOREIGN PATENT DOCUMENTS

| JP | 3056535 | 3/1991 |
| JP | 3212451 | 9/1991 |
| JP | 5209022 | 8/1993 |
| JP | 6322136 | 11/1994 |
| JP | 9087521 | 3/1997 |
| JP | 10130450 | 5/1998 |
| JP | 11001893 | 1/1999 |
| JP | 11-505629 | 5/1999 |

(Continued)

*Primary Examiner* — Milton I Cano
*Assistant Examiner* — Darcy D LaClair
(74) *Attorney, Agent, or Firm* — Morgan, Lewis & Bockius LLP

(57) ABSTRACT

Disclosed is an organic-inorganic hybrid composition containing a metal oxide (A) having a particle diameter of 1-400 nm and a polymer emulsion particle (B) having a particle diameter of 10-800 nm. The polymer emulsion particle (B) is obtained by polymerizing a hydrolysable silicon compound (b1) and a vinyl monomer (b2) having a secondary and/or tertiary amide group in the presence of water and an emulsifying agent.

22 Claims, 1 Drawing Sheet

FOREIGN PATENT DOCUMENTS

| | | |
|---|---|---|
| JP | 2001114898 | 4/2001 |
| JP | 2002206041 | 7/2002 |
| JP | 2003-501511 | 1/2003 |
| JP | 2003041198 | 2/2003 |
| JP | 2003313426 | 11/2003 |
| JP | 2004-292686 | 10/2004 |
| JP | 2004292686 | 10/2004 |
| JP | 2005-113030 | 4/2005 |
| JP | 2005113030 | 4/2005 |
| JP | 2005132996 | 5/2005 |
| WO | WO 00/30747 | 6/2000 |
| WO | WO-00-30747 | 6/2000 |
| WO | WO 0030747 A1 * | 6/2000 |
| WO | WO 00/73393 | 12/2000 |
| WO | WO 2005/075583 | 8/2005 |

* cited by examiner

AQUEOUS ORGANIC-INORGANIC HYBRID COMPOSITION

The present application is a U.S. National Phase Application of International Application PCT/JP2006/324745 (filed Dec. 12, 2006) which claims the benefit of Japanese Patent Application 2005-359091 (filed Dec. 13, 2005), all of which are incorporated by reference in their entireties.

TECHNICAL FIELD

The present invention relates to an aqueous organic-inorganic hybrid composition capable of forming an organic-inorganic hybrid substance excellent in properties such as weather resistance, chemical resistance, optical properties, and additionally, antifouling property, antifogging property and antistatic property. The aqueous organic-inorganic hybrid composition of the present invention is useful particularly as coating agents for building exterior, automobiles, displays and lenses.

In these years, a large number of researches have been performed on organic-inorganic hybrid materials with the aim of constructively combining the advantages of organic polymers such as workability of satisfactory level, flexibility and adhesiveness with the advantages of inorganic substances such as weather resistance, flame retardance and chemical resistance. In general, however, organic polymers are poor in compatibility with inorganic polymers, and hence frequently such hybrid substances are heterogeneous, and the advantages of organic polymers and the advantages of inorganic substances are not effectively developed.

In connection with the above-described problems, there have been proposed organic-inorganic hybrid materials microscopically homogeneous and transparent.

For example, JP-A-3-212451 discloses that: a hydrolysis-polymerizable organometal compound is hydrolysis-polymerized in the presence of a nonreactive polymer having amide bonds such as poly(N-acetylethyleneimine) or polyvinylpyrrolidone, and thus a gel is formed; in this way, there is obtained an organic-inorganic hybrid transparent homogeneous substance in which the amide bond-containing nonreactive polymer is uniformly dispersed in the three-dimensional micronetwork structure of the thus formed metal oxide gel.

Additionally, JP-A-3-56535 discloses a method for producing an oxazoline/silica hybrid molded body in which a hydrolysis-polymerizable silyl group-containing oxazoline polymer and a hydrolysis-polymerizable silane are hydrolysis-polymerized.

These prior documents also give a description that tetraalkoxysilane or the like is used as a hydrolyzable compound and the above-described hybrid substances can be molded into films or the like. However, all of these hybrid substances are poor in film formability, moldability and stringiness, and hence it is difficult to obtain continuously and efficiently uniform films, yarns and the like by coating, spinning and the like. Accordingly, although these hybrid substances have such excellent properties of being transparent and microscopically homogeneous, the applications of these hybrid substances have been limited.

As a method for solving these problems, JP-A-6-322136 and JP-A-2003-41198 disclose that an inorganic substance and an organic polymer are, or an inorganic polymer-organic polymer copolymer is dissolved or dispersed in an organic solvent, and the film formability and the moldability are thereby improved.

However, there has been a problem that the organic solvent having a problem of toxicity or environmental pollution or a danger of fire is released in the atmosphere in order to obtain an organic-inorganic hybrid material from the solution or the dispersion, when the solution or the dispersion is used.

JP-A-9-87521 and JP-A-5-209022 disclose methods in each of which instead of using the organic solvent, an inorganic polymer or an inorganic oxide is dissolved or dispersed in an amide group-containing vinyl monomer to improve the film formability or the moldability, and the amide group-containing vinyl monomer is polymerized with the aid of a polymerization initiator to yield an organic-inorganic hybrid material.

In these methods, although no organic solvent is required to be used in order to obtain the organic-inorganic hybrid material, the toxicity and the environmental pollution of the amide group-containing vinyl monomer itself have still remained unsolved. Additionally, the step of polymerization of the amide group-containing vinyl monomer is indispensable in order to obtain the organic-inorganic hybrid material, and hence these methods have a problem that the production of the organic-inorganic hybrid material needs a specific apparatus, and thus these methods have no general versatility. Further, there has been a problem that when the polymerization of the amide group-containing vinyl monomer is incomplete due to the effect of the oxygen and the like present in the atmosphere, the highly toxic amide group-containing vinyl monomer remains in the organic-inorganic hybrid material.

Patent Document 1: JP-A-3-212451
Patent Document 2: JP-A-3-56535
Patent Document 3: JP-A-6-322136
Patent Document 4: JP-A-2003-41198
Patent Document 5: JP-A-9-87521
Patent Document 6: JP-A-5-209022

DISCLOSURE OF THE INVENTION

Problems to be Solved by the Invention

The problem to be solved by the present invention is to provide an aqueous organic-inorganic hybrid composition that is capable of forming an organic-inorganic hybrid substance excellent in properties such as weather resistance, chemical resistance, optical properties, and additionally, antifouling property, antifogging property and antistatic property, without using any specific apparatus in a simple manner with a small environmental load, and that is excellent in film formability and moldability.

Means for Solving the Problems

The present inventors diligently studied in order to solve the above-described problem, and consequently reached the present invention.

Specifically, the present invention is as follows.

(1) An aqueous organic-inorganic hybrid composition characterized by comprising: a metal oxide (A) having a particle size of 1 to 400 nm; and a polymer emulsion particle (B) having a particle size of 10 to 800 nm, obtained by polymerizing a hydrolyzable silicon compound (b1) and a secondary and/or tertiary amide group-containing vinyl monomer (b2) in the presence of water and an emulsifier.

(2) The aqueous organic-inorganic hybrid composition according to (1), wherein the amount of the secondary and/or tertiary amide group-containing vinyl monomer (b2) used for obtaining the polymer emulsion particle (B) is 0.1 or more and 0.5 or less in terms of the mass ratio (b2)/(B) of the secondary and/or tertiary amide group-containing vinyl monomer (b2) to the polymer emulsion particle (B) to be obtained.

(3) The aqueous organic-inorganic hybrid composition according to (2), wherein the mass ratio (b2)/(A) of the secondary and/or tertiary amide group-containing vinyl monomer (b2) used for obtaining the polymer emulsion particle (B) to the metal oxide (A) is 0.1 or more and 1.0 or less.

(4) The aqueous organic-inorganic hybrid composition according to any one of (1) to (3), wherein the polymer emulsion particle (B) is a core/shell structure formed of two or more layers.

(5) The aqueous organic-inorganic hybrid composition according to any one of (1) to (4), wherein the polymer emulsion particle (B) is a core/shell structure, the mass ratio (b2)/(b1) of the secondary and/or tertiary amide group-containing vinyl monomer (b2) to the hydrolyzable silicon compound (b1) in the innermost layer of the core/shell structure is 1.0 or less, and the mass ratio (b2)/(b1) in the outermost layer is 0.1 or more and 5.0 or less.

(6) The aqueous organic-inorganic hybrid composition according to any one of (1) to (5), wherein the polymer emulsion particle (B) is obtained by polymerizing the hydrolyzable silicon compound (b1) and the secondary and/or tertiary amide group-containing vinyl monomer (b2) in the presence of a seed particle which is obtained by polymerizing the secondary and/or tertiary amide group-containing vinyl monomer (b2) and/or an additional vinyl monomer (b3) copolymerizable with the monomer (b2) and/or the hydrolyzable silicon compound (b1) in the presence of water and an emulsifier.

(7) The aqueous organic-inorganic hybrid composition according to any one of (1) to (6), wherein the polymer emulsion particle (B) is obtained by polymerizing the hydrolyzable silicon compound (b1) and the secondary and/or tertiary amide group-containing vinyl monomer (b2) in the presence of a seed particle which is obtained by polymerizing the hydrolyzable silicon compound (b1) in the presence of water and an emulsifier.

(8) The aqueous organic-inorganic hybrid composition according to any one of (1) to (7), wherein the hydrolyzable silicon compound (b1) comprises at least one vinyl polymerizable group-containing hydrolyzable silicon compound, and the amount of the hydrolyzable silicon compound (b1) is 0.01 part by mass or more and 20 parts by mass or less in relation to 100 parts by mass of the polymer emulsion particle (B).

(9) The aqueous organic-inorganic hybrid composition according to any one of (1) to (8), wherein the hydrolyzable silicon compound (b1) includes at least one vinyl polymerizable group-containing hydrolyzable silicon compound, and the used amount of the hydrolyzable silicon compound (b1) is 0.1 part by mass or more and 100 parts by mass or less in relation to 100 parts by mass of the secondary and/or tertiary amide group-containing vinyl monomer (b2).

(10) The aqueous organic-inorganic hybrid composition according to any one of (1) to (9), wherein the metal oxide (A) is at least one selected from the group consisting of silicon dioxide, a photocatalytically active metal oxide and a conductive metal oxide.

(11) The aqueous organic-inorganic hybrid composition according to any one of (1) to (10), characterized by comprising a modified metal oxide (A') obtained by modifying the metal oxide (A) with at least one modifier compound selected from the compounds containing at least one structure unit selected from the group consisting of a triorganosilane unit represented by formula (1), a monooxydiorganosilane unit represented by formula (2), a dioxyorganosilane unit represented by formula (3), a trioxysilane unit represented by formula (4) and a difluoromethylene unit:

$R_3Si-$ (1)

wherein Rs are each independently a linear or branched alkyl group having 1 to 30 carbon atoms, a cycloalkyl group having 5 to 20 carbon atoms, a linear or branched fluoroalkyl group having 1 to 30 carbon atoms, a linear or branched alkenyl group having 2 to 30 carbon atoms, a phenyl group, an alkoxy group having 1 to 20 carbon atoms or a hydroxyl group,

$-(R_2SiO)-$ (2)

wherein Rs are defined in the same manner as in formula (1),

[Formula 1]

(3)

wherein R is defined in the same manner as in formula (1),

[Formula 2]

(4)

(12) The aqueous organic-inorganic hybrid composition according to (11), wherein the metal oxide is a photocatalytically active metal oxide.

(13) The aqueous organic-inorganic hybrid composition according to (10) or (12), wherein the ratio (l/d) of a particle length (l) to a particle diameter (d) of the photocatalytically active metal oxide is 1/1 to 20/1.

(14) The aqueous organic-inorganic hybrid composition according to any one of (1) to (13), including an alcohol.

(15) An organic-inorganic hybrid substance formed of the aqueous organic-inorganic hybrid composition according to any one of (1) to (14).

(16) An organic-inorganic hybrid substance comprising the aqueous organic-inorganic hybrid composition according to any one of (1) to (14).

(17) The organic-inorganic hybrid substance according to (15) or (16), wherein a continuous layer is formed under a condition that the metal oxide (A) and a shell phase interact with each other, and a particle-like core phase is present in the continuous layer.

(18) The organic-inorganic hybrid substance according to any one of (15) to (17), wherein a water contact angle at 23° C. is 30° or less.

(19) A functional hybrid article comprising the organic-inorganic hybrid substance according to any one of (15) to (18) on a substrate.

(20) A functional hybrid article which comprises on a substrate the organic-inorganic hybrid substance formed of the aqueous organic-inorganic hybrid composition according to any one of (11) to (14), the functional hybrid article being characterized in that the concentration of the modified metal oxide (A') in the organic-inorganic hybrid substance is higher on an exposed side of the organic-inorganic hybrid substance than on another side in contact with the substrate of the organic-inorganic hybrid substance.

(21) A functional hybrid article for building exterior comprising on a substrate the organic-inorganic hybrid substance according to any one of (15) to (18) and (20).

(22) A functional hybrid article for outer package marking comprising on a resin substrate the organic-inorganic hybrid substance according to any one of (15) to (18) and (20).

The aqueous organic-inorganic hybrid composition of the present invention is capable of forming an organic-inorganic hybrid substance excellent in properties such as weather resistance, chemical resistance, optical properties, and additionally, antifouling property, antifogging property and antistatic property, even without using any organic solvent and any specific apparatus.

BEST MODE FOR CARRYING OUT THE INVENTION

Hereinafter, the present invention is described in detail.

The aqueous organic-inorganic hybrid composition of the present invention is characterized by including: a metal oxide (A) having a particle size of 1 to 400 nm; and a polymer emulsion particle (B) having a particle size of 10 to 800 nm, obtained by polymerizing a hydrolyzable silicon compound (b1) and a secondary and/or tertiary amide group-containing vinyl monomer (b2) in the presence of water and an emulsifier.

In the aqueous organic-inorganic hybrid composition of the present invention, the metal oxide (A) interacts with the polymer emulsion particle (B) and thereby functions as a curing agent for the polymer emulsion particle (B). Consequently, it becomes possible to form an organic-inorganic hybrid substance excellent in properties such as weather resistance, chemical resistance, optical properties, and additionally, antifouling property, antifogging property and antistatic property, by using the aqueous organic-inorganic hybrid composition of the present invention.

In this connection, examples of such an interaction between the metal oxide (A) and the polymer emulsion particle (B) may include the hydrogen bonding between the hydroxyl group possessed by the metal oxide (A) and the secondary and/or tertiary amide group possessed by the polymer emulsion particle (B), and the condensation (chemical bonding) between the hydroxyl group possessed by the metal oxide (A) and the polymerization product of the hydrolyzable metal compound (b1) constituting the polymer emulsion particle (B).

Examples of the metal oxide (A) preferably usable in the present invention may include silicon dioxide, aluminum oxide, antimony oxide, titanium oxide, indium oxide, tin oxide, zirconium oxide, lead oxide, iron oxide, calcium silicate, magnesium oxide, niobium oxide, cerium oxide and the composite oxides of these. Preferable among these are silicon dioxide (silica) abundant in surface hydroxyl groups, aluminum oxide (alumina), antimony oxide and the composite oxides of these.

Additionally, in the present invention, selection of a photocatalyst as the metal oxide (A) is highly preferable because consequently the organic-inorganic hybrid substance formed of the aqueous organic-inorganic hybrid composition of the present invention is made to develop by light irradiation photocatalytic activity and/or hydrophilicity.

The photocatalyst as referred to herein means a substance that causes an oxidation-reduction reaction by light irradiation. In other words, a photocatalyst is a substance in which when irradiated with a light (excitation light) having a larger energy (namely, shorter in wavelength) than the energy gap between the conduction band and the valence band, the excitation (photoexcitation) of the electrons in the valence band is caused to generate the conduction electrons and the positive holes; thus, the photocatalyst can perform various chemical reactions by taking advantage of the reduction ability of the electrons generated in the conduction band and/or the oxidation ability of the positive holes generated in the valence band.

Additionally, the photocatalytic activity means to cause an oxidation-reduction reaction by light irradiation. Such photocatalytic activity of a material can be determined by measuring the decomposition degree of an organic substance such as a dye on the surface of the material when the surface is light irradiated. A surface that has photocatalytic activity develops excellent decomposition activity for staining organic substances and stain resistance against staining organic substances.

Additionally, the hydrophilicity as referred to in the present invention means a case where the water contact angle at 20° C. is preferably 60° or less; in particular, a surface having a hydrophilicity such that the water contact angle is 30° or less is preferable because such surface develops a stain resistance due to the self-cleaning ability provided by water from a source such as rainfall. From the viewpoint of developing further excellent stain resistance and antifogging property, the water contact angle of the surface is preferably 20° or less, more preferably 10° or less and furthermore preferably 5° or less.

Examples of the photocatalyst usefully usable as the metal oxide (A) of the present invention may include a semiconductor compound in which the band gap energy is 1.2 to 5.0 eV and more preferably 1.5 to 4.1 eV. When the band gap energy is smaller than 1.2 eV, unpreferably the ability to cause oxidation-reduction reaction is very weak. When the band gap energy is larger than 5.0 eV, unpreferably the light energy required to generate the positive holes and electrons becomes very large.

Examples of the photocatalyst may include $TiO_2$, $ZnO$, $SrTiO_3$, $BaTiO_3$, $BaTiO_4$, $BaTi_4O_9$, $K_2NbO_3$, $Nb_2O_5$, $Fe_2O_3$, $Ta_2O_5$, $K_3Ta_3Si_2O_3$, $WO_3$, $SnO_2$, $Bi_2O_3$, $BiVO_4$, $NiO$, $Cu_2O$, $RuO_2$ and $CeO_2$, and additionally a layered oxide containing at least one element selected from Ti, Nb, Ta and V (see, for example, JP-A-62-74452, JP-A-2-172535, JP-A-7-24329, JP-A-8-89799, JP-A-8-89800, JP-A-8-89804, JP-A-8-198061, JP-A-9-248465, JP-A-10-99694 and JP-A-10-244165).

Preferable among these photocatalysts is $TiO_2$ (titanium oxide) because $TiO_2$ is harmless and excellent in chemical stability. As titanium oxide, any of anatase, rutile and brookite may be used.

A visible light responsive photocatalyst that can develop photocatalytic activity and/or hydrophilicity by irradiation of visible light (for example, approximately 400 to 800 nm in wavelength) is preferably selected as the photocatalyst used as the metal oxide (A) of the present invention, because a photocatalytic material treated with the photocatalytic composition of the present invention displays a very high environmental cleaning effect and a very high antifouling effect in a place such as the interior of a room where no sufficient irradiation of ultraviolet light is available. These visible light responsive photocatalysts each have a band gap energy of preferably 1.2 to 3.1 eV, more preferably 1.5 to 2.9 eV and furthermore preferably 1.5 to 2.8 eV.

As the above-described visible light responsive photocatalysts, any photocatalyst can be used as long as the photocatalyst develops photocatalytic activity and/or hydrophilicity by visible light irradiation. Preferable examples of such photocatalysts may include: oxynitride compounds such as TaON, $LaTiO_2N$, $CaNbO_2N$, $LaTaON_2$ and $CaTaO_2N$ (see, for example, JP-A-2002-66333); oxysulfide compounds such as $Sm_2Ti_2S_2O_7$ (see, for example, JP-A-2002-233770); $d^{10}$ electronic state metal ion-containing oxides such as $CaIn_2O_4$, $SrIn_2O_4$, $ZnGa_2O_4$ and $Na_2Sb_2O_6$ (see, for example, JP-A-2002-59008); nitrogen-doped titanium oxides obtained by baking titanium oxide precursors (such as titanium oxysulfate, titanium chloride and alkoxy titan) or high-surface titanium oxide in the presence of a nitrogen-containing compound such as ammonia or urea (see, for example, JP-A-2002-29750, JP-A-2002-87818, JP-A-2002-154823 and JP-A-2001-207082); sulfur-doped titanium oxides obtained by baking titanium oxide precursors (such as titanium oxysulfate, titanium chloride and alkoxy titan) in the presence of a sulfur compound such as thiourea; oxygen-defected titanium oxide obtained by subjecting titanium oxide to a treatment such as hydrogen plasma treatment or a heat treatment under vacuum (see, for example, JP-A-2001-98219); and surface-treated photocatalysts such as a surface-treated photocatalyst obtained by treating a photocatalyst particle with a platinum halide compound (see, for example, JP-A-2002-239353) and a surface-treated photocatalyst obtained by treating a photocatalyst particle with tungsten alkoxide (see, for example, JP-A-2001-286755).

Among the above-described visible light responsive photocatalysts, oxynitride compounds and oxysulfide compounds are high in photocatalytic activity with visible light and can be particularly preferably used.

The oxynitride compounds particularly preferably usable in the present invention are transition metal-containing oxynitrides; among these, from the viewpoint of high photocatalytic activity, preferable are oxynitrides characterized in that the transition metal is at least one selected from the group consisting of Ta, Nb, Ti, Zr and W, more preferable are oxynitrides characterized by further including at least one element selected from the group consisting of alkali metals, alkali earth metals and group IIIB metals, and furthermore preferable are oxynitrides characterized by further including at least one metal element selected from the group consisting of Ca, Sr, Ba, Rb, La and Nd.

Examples of the above-described transition metal-containing oxynitrides may include: compounds represented by a general formula AMOxNy (A=an alkali metal, an alkali earth metal or a group IIIB metal; M=Ta, Nb, Ti, Zr or W; x+y=3) such as $LaTiO_2N$, $La_vCa_wTiO_2N$ (v+w=3), $La_vCa_wTaO_2N$ (v+w=3), $LaTaON_2$, $CaTaO_2N$, $SrTaO_2N$, $BaTaO_2N$, $CaNbO_2N$, $CaWO_2N$ and $SrWO_2N$; and TaON, NbON, WON and $Li_2LaTa_2O_6N$. Preferable among these are $LaTiO_2N$, $LavCawTiO_2N$ (v+w=3), $LavCawTaO_2N$ (v+w=3) and TaON because of very high photocatalytic activity with visible light.

The oxysulfide compounds particularly preferably usable in the present invention are transition metal-containing oxysulfides; among these, from the viewpoint of high photocatalytic activity, preferable are oxysulfides characterized in that the transition metal is at least one selected from the group consisting of Ta, Nb, Ti, Zr and W, more preferable are oxysulfides characterized by further including at least one element selected from the group consisting of alkali metals, alkali earth metals and group IIIB metals, and furthermore preferable are oxysulfides characterized by further including a rare earth element.

Examples of the above-described transition metal-containing oxysulfides may include: $Sm_2Ti_2S_2O_5$, $Nd_2Ti_2S_2O_5$, $La_6Ti_2S_8O_5$, $Pr_2Ti_2S_2O_5$ and $Sm_3NbS_3O_4$. Preferable among these are $Sm_2Ti_2S_2O_5$ and $Nd_2Ti_2S_2O_5$ because of high photocatalytic activity with visible light.

Further, the above-described photocatalysts may also be preferably used after adding thereto or fixing thereon metals such as Pt, Rh, Ru, Nb, Cu, Sn, Ni and Fe and/or the oxides of these metals, or after coating the photocatalysts with silica, porous calcium phosphate or the like (see, for example, JP-A-10-244166).

From the viewpoints of the specific surface area of photocatalyst particles and the orientation effects of the photocatalyst particles, the shapes of the particles of the photocatalysts used in the present invention are such that the ratio (l/d) of the particle length (l) to the particle diameter (d) falls within a range preferably from 1/1 to 20/1, more preferably from 1/1 to 15/1 and furthermore preferably from 1/1 to 10/1.

Additionally, in the present invention, selection of a conductive metal oxide as the metal oxide (A) is highly preferable because consequently the organic-inorganic hybrid substance formed of the aqueous organic-inorganic hybrid composition of the present invention is made to develop conductive capability, antistatic capability, electromagnetic wave blocking capability and surface heat emitting capability.

Examples of the conductive metal oxide usefully usable as the metal oxide (A) of the present invention may include tin-doped indium oxide (ITO), antimony-doped tin oxide (ATO), tin oxide and zinc oxide.

In the aqueous organic-inorganic hybrid composition of the present invention, for the purpose of forming an organic-inorganic hybrid substance excellent in properties such as transparency, strength and weather resistance, the particle size of the metal oxide (A) is required to be 1 to 400 nm, preferably 1 to 100 nm and more preferably 5 to 50 nm.

The usable form of the metal oxide (A) used in the present invention may be any of a powder, a dispersion liquid and a sol. Here, the metal oxide (A) sol and the metal oxide (A) dispersion liquid used in the present invention each mean a condition that the photocatalyst particles are dispersed as primary particles and/or secondary particles in water and/or a hydrophilic organic solvent in an amount of 0.01 to 80% by mass and preferably in an amount of 0.1 to 50% by mass.

Here, examples of the hydrophilic organic solvent used for the metal oxide (A) sol or the metal oxide (A) dispersion liquid include: alcohols such as ethylene glycol, butyl cellosolve, n-propanol, isopropanol, n-butanol, ethanol and methanol; ketones such as acetone, methyl ethyl ketone and methyl isobutyl ketone; ethers such as tetrahydrofuran and dioxane; amides such as dimethylacetamide and dimethylformamide; dimethyl sulfoxide and nitrobenzene; and mixtures of two or more of these solvents.

In the present invention, the form of the metal oxide (A) used therein is an important factor for developing functions such as optical properties of the organic-inorganic hybrid substance. Desirable as the metal oxide (A) preferably used in the present invention is the metal oxide (A) sol or the metal oxide (A) dispersion liquid in which the number average dispersion particle size in the mixture composed of the primary particles and the secondary particles (the mixture may include an extreme case involving only either the primary particles or the secondary particles) is 1 to 400 nm. In particular, use of the metal oxide (A) sol or the metal oxide (A) dispersion liquid having a number average dispersion particle size of 1 to 100 nm is highly preferable because such use enables to obtain an organic-inorganic hybrid substance excellent in transparency from the aqueous organic-inorganic hybrid composition of the present invention. The metal oxide (A) sol or the metal oxide (A) dispersion liquid having a number average dispersion particle size of more preferably 3 to 80 nm, and furthermore preferably 5 to 50 nm is preferably selected.

In the present invention, a modified metal oxide (A') that is extremely excellent in properties such as the dispersion stability in relation to the solvent, chemical stability and durability is obtained by modifying the metal oxide (A) with at least one modifier compound selected from the group consisting of the compounds containing at least one structure unit selected from the group consisting of a triorganosilane unit represented by formula (1), a monooxydiorganosilane unit represented by formula (2), a dioxyorganosilane unit represented by formula (3), a trioxysilane unit represented by formula (4) and a difluoromethylene unit:

$$R_3Si— \quad (1)$$

wherein Rs are each independently a linear or branched alkyl group having 1 to 30 carbon atoms, a cycloalkyl group having 5 to 20 carbon atoms, a linear or branched fluoroalkyl group having 1 to 30 carbon atoms, a linear or branched alkenyl group having 2 to 30 carbon atoms, a phenyl group, an alkoxy group having 1 to 20 carbon atoms or a hydroxyl group, $$—(R_2SiO)— \quad (2)$$

wherein Rs are defined in the same manner as in formula (1),

[Formula 3]

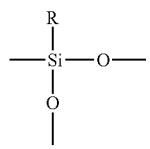
(3)

wherein R is defined in the same manner as in formula (1),

[Formula 4]

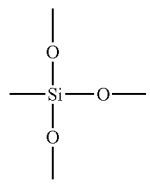
(4)

Additionally, selection of a compound, as the modifier compound, having a small surface energy (for example, a compound in which the R groups in above formulas (1) to (4) are each at least one selected from a linear or branched alkyl group having 1 to 30 carbon atoms, a linear or branched fluoroalkyl group having 1 to 30 carbon atoms and a linear or branched alkenyl group having 2 to 30 carbon atoms, and/or a compound having a difluoromethylene unit) reduces the surface energy of the obtained modified metal oxide (A') and thus the modified metal oxide (A') can have a self-gradient function.

The self-gradient function as referred to herein means that when a below described functional hybrid article is produced by forming on a substrate an organic-inorganic hybrid substance from the aqueous organic-inorganic hybrid composition that contains the modified metal oxide (A'), the polymer emulsion particle (B) and the metal oxide (A), the modified metal oxide (A') autonomously forms a structure having a concentration gradient of the modified metal oxide (A'), in the course of the formation of the organic-inorganic hybrid substance, in response to the nature (in particular hydrophilicity/hydrophobicity) of the interface with which the organic-inorganic hybrid substance is brought into contact.

In the present invention, selection of the above-described photocatalyst as the metal oxide (A) is highly preferable because from the aqueous organic-inorganic hybrid composition of the present invention that contains a modified photocatalyst (D) subjected to a modifying treatment with the above-described modifier compound having a structure small in surface energy, there can be obtained a functional hybrid article that exhibits a high photocatalytic activity, does not decompose the substrate and has an excellent photocatalytic function owing to the fact that the modified photocatalyst (D) is present on the organic-inorganic hybrid substance surface in contact with air in a larger amount with a smaller amount of the modified photocatalyst (D) in the interface between the substrate and the organic-inorganic hybrid substance.

Additionally, the modifying treatment as referred to in the present invention means to fix the modifier compound to the surface of the metal oxide (A). The fixation of the modifier compound to the surface of the metal oxide (A) is conceivably caused by the van der Waals force (physical adsorption) or chemical bonding. Particularly preferable is the fixation utilizing chemical bonding because such fixation provides a strong interaction between the modifier compound and the metal oxide (A), and hence the modifier compound is strongly fixed to the surface of the metal oxide (A) particles.

In the present invention, the modifying treatment of the metal oxide (A) with the modifier compound (b) can be achieved by mixing, in the presence or absence of water and/or an organic solvent, the above-described metal oxide (A) and the above-described modifier compound (b) preferably in a mass ratio (a)/(b)=1/99 to 99.99/0.01, and more preferably in a mass ratio (a)/(b)=10/90 to 99.5/0.5 to prepare a mixture, and by applying operations such as heating preferably at 0 to 200° C. and more preferably at 10 to 80° C. or varying the solvent composition of the mixture by (reduced pressure) distillation.

In performing the modifying treatment, examples of the usable organic solvents include: aromatic hydrocarbons such as toluene and xylene; aliphatic hydrocarbons such as hexane, cyclohexane and heptane; esters such as ethyl acetate and n-butyl acetate; alcohols such as ethylene glycol, butyl cellosolve, isopropanol, n-butanol, ethanol and methanol; ketones such as acetone, methyl ethyl ketone, methyl isobutyl ketone and cyclohexanone; ethers such as tetrahydrofuran and dioxane; amides such as dimethylacetamide and dimethylformamide; halogen compounds such as chloroform, methylene chloride and carbon tetrachloride; dimethyl sulfoxide; nitrobenzene; and mixtures of two or more of these solvents.

Examples of the modifier compound preferably used for modifying treatment of the metal oxide (A) of the present invention may include: silicon compounds, fluoroalkyl compounds and fluoroolefin polymers including groups having a reactivity with the photocatalyst particle (a) such as a Si—H group, a hydrolyzable silyl group (such as an alkoxysilyl group, a hydroxysilyl group, a halogenated silyl group, an acetoxysilyl group or an aminoxysilyl group), an epoxy group, an acetoacetyl group, a thiol group and an acid anhydride group. These compounds are more preferable because these compounds can be chemically bonded to the metal oxide (A) and thus strongly fixed to the surface of the metal oxide (A).

Specific examples of the fluoroalkyl compounds among the above-descried modifier compounds may include the compounds that can be represented by formula (5):

$$CF_3(CF_2)g—Y—(V)w \quad (5)$$

wherein g represents an integer of 0 to 29; Y represents a w-valent organic group having a molecular weight of 14 to 50000; w is an integer of 1 to 20; V represents at least one functional group selected from the group consisting of an epoxy group, a hydroxyl group, an acetoacetyl group, a thiol group, a cyclic acid anhydride group, a carboxyl group, a sulfonic acid group, a polyoxyalkylene group, a phosphoric acid group, and a group represented by following formula (6):

$$—SiWxRy \quad (6)$$

wherein W represents at least one group selected from an alkoxy group having 1 to 20 carbon atoms, a hydroxyl group, an acetoxy group having 1 to 20 carbon atoms, a halogen atom, a hydrogen atom, an oxime group having 1 to 20 carbon atoms, an enoxy group, an aminoxy group and an amide group; R represents at least one hydrocarbon group selected from a linear or branched alkyl group having 1 to 30 carbon atoms, a cycloalkyl group having 5 to 20 carbon atoms and an aryl group having 6 to 20 carbon atoms that is not substituted or substituted with an alkyl group having 1 to 20 carbon atoms, an alkoxy group having 1 to 20 carbon atoms or a halogen atom; and x is an integer of 1 or more and 3 or less, y is an integer of 0 or more and 2 or less, and x+y=3.

The polymer emulsion particle (B) used in the aqueous organic-inorganic hybrid composition of the present invention can be obtained by polymerizing the hydrolyzable silicon metal compound (b1) and the secondary and/or tertiary amide group-containing vinyl monomer (b2) in the presence of water and an emulsifier.

In this polymerization, the mass ratio (b2)/(b1) of the secondary and/or tertiary amide group-containing vinyl monomer (b2) to the hydrolyzable silicon compound (b1) is 5/95 to 95/5, and preferably 10/90 to 90/10.

In the polymer emulsion particle (B) thus obtained, the hydroxyl groups contained in the polymerization product of the hydrolyzable silicon compound (b1) and the polymerization product of secondary and/or tertiary amide group-containing vinyl monomer (b2) are hybridized with the aid of the hydrogen bonds.

Examples of the hydrolyzable silicon compound (b1) used in the production of the polymer emulsion particle (B) of the present invention may include the compounds represented by following formula (5), the condensation products of these compounds and silane coupling agents:

$$SiWxRy \quad (5)$$

wherein W represents at least one group selected from an alkoxy group having 1 to 20 carbon atoms, a hydroxyl group, an acetoxy group having 1 to 20 carbon atoms, a halogen atom, a hydrogen atom, an oxime group having 1 to 20 carbon atoms, an enoxy group, an aminoxy group and an amide group; R represents at least one hydrocarbon group selected from a linear or branched alkyl group having 1 to 30 carbon atoms, a cycloalkyl group having 5 to 20 carbon atoms and an aryl group having 6 to 20 carbon atoms that is not substituted or substituted with an alkyl group having 1 to 20 carbon atoms, an alkoxy group having 1 to 20 carbon atoms or a halogen atom; and x is an integer of 1 or more and 4 or less, y is an integer of 0 or more and 3 or less, and x+y=4.

Here, the silane coupling agent represents the hydrolyzable silicon compound (b1) having in the molecule thereof functional groups having reactivity with organic substances such as a vinyl-polymerizable group, an epoxy group, an amino group, a methacryl group, a mercapto group and an isocyanate group.

Specific examples of the silicon alkoxide and the silane coupling agent may include: tetraalkoxysilanes such as tetramethoxysilane, tetraethoxysilane, tetra-n-propoxysilane, tetraisopropoxysilane and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, allyltrimethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatopropyltrimethoxysilane, 3-isocyanatopropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-(meth)acryloyloxypropyltri-n-propoxysilane, 3-(meth)acryloyloxypropyltriisopropoxysilane, 3-ureidopropyltrimethoxysilane and 3-ureidopropyltriethoxysilane; dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, diisopropyldimethoxysilane, diisopropyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, diphenyldiethoxysilane and 3-(meth)acryloyloxypropylmethyldimethoxysilane; and monoalkoxysilanes such as trimethylmethoxysilane and trimethylethoxysilane. Additionally, these silicon alkoxides and silane coupling agents may be used each alone or as mixtures of two or more thereof.

When the silicon alkoxides and the silane coupling agents are used as the condensation products, the weight average molecular weights, determined relative to polystyrene standards, of the condensation products are preferably 200 to 5000, and more preferably 300 to 1000.

Highly preferable among the above-described silicon alkoxides are phenyl group-containing silicon alkoxides such as phenyltrimethoxysilane, phenyltriethoxysilane and diphenyldimethoxysilane because these are excellent in polymerization stability in the presence of water and an emulsifier.

Among the hydrolyzable silicon compounds (b1) usable in the present invention, the following vinyl polymerizable group-containing silane coupling agents and the following thiol group-containing silane coupling agents are capable of generating chemical bonds through the copolymerization or the chain transfer reaction with the above-described secondary and/or tertiary amide group-containing vinyl monomer (b2): vinyl polymerizable group-containing silane coupling agents such as 3-(meth)acryloxypropyltrimethoxysilane, 3-(meth)acryloxypropyltriethoxysilane, 3-(meth)acryloxypropylmethyldimethoxysilane, 3-(meth)acryloyloxypropyltri-n-propoxysilane, 3-(meth)acryloyloxypropyltri-isopropoxysilane, vinyltrimethoxysilane, vinyltriethoxysilane, allyltrimethoxysilane and 2-trimethoxysilylethyl vinyl ether; and thiol group-containing silane coupling agents such as 3-mercaptopropyltrimethoxysilane and 3-mercaptopropyltriethoxysilane. Accordingly, when vinyl polymerizable group-containing silane coupling agents or thiol group-containing silane coupling agents are used each alone or as mixtures or as hybrids with the above-described silicon alkoxides, silane coupling agents and the condensation products of these, the polymerization product of the hydrolyzable silicon compound (b1) and the polymerization product of the secondary and/or tertiary amide group-containing vinyl monomer (b2) constituting the polymer emulsion particle (B) of the present invention can be hybridized through chemical bonds in addition to hydrogen bonds. The aqueous organic-inorganic hybrid composition of the present invention including such a polymer emulsion particle (B) is highly preferable because such an aqueous organic-inorganic hybrid composition is capable of forming an organic-inorganic hybrid substance excellent in properties such as weather resistance, chemical resistance, optical properties and strength.

In the present invention, from the viewpoint of weather resistance, it is particularly preferable to use a vinyl polymerizable group-containing silane coupling agent as the hydrolyzable silicon compound (b1). From the viewpoint of polymerization stability, the mixing amount of the vinyl-polymerizable group-containing silane coupling agent is preferably 0.01 part by mass or more and 20 parts by mass or less, and more preferably 0.1 part by mass or more and 10 parts by mass or less in relation to 100 parts by mass of the polymer emulsion particle (B).

Additionally, from the viewpoint of polymerization stability, the mixing amount of the vinyl polymerizable group-containing silane coupling agent is preferably 0.1 part by mass or more and 100 parts by mass or less, and more preferably 0.5 part by mass or more and 50 parts by mass or less, in relation to 100 parts by mass of the secondary and/or tertiary amide group-containing vinyl monomer (b2).

In the present invention, a cyclic siloxane oligomer can be used in combination with the above-described hydrolyzable silicon compound (b1). By using a cyclic siloxane oligomer in combination, an organic-inorganic hybrid substance excellent in properties such as flexibility can be formed from the aqueous organic-inorganic hybrid composition of the present invention.

Examples of the cyclic siloxane oligomer include a compound represented by following formula (6):

$$(R'_2SiO)_m \quad (6)$$

wherein R' represents at least one selected from a hydrogen atom, a linear or branched alkyl group having 1 to 30 carbon atoms, a cycloalkyl group having 5 to 20 carbon atoms, and an aryl group having 6 to 20 carbon atoms that is not substituted or substituted with an alkyl group having 1 to 20 carbon atoms, an alkoxy group having 1 to 20 carbon atoms or a halogen atom; and m is an integer satisfying the relation $2 \leq m \leq 20$.

Among the cyclic siloxane oligomers, from the viewpoint of reactivity and the like, preferable are cyclic dimethyl siloxane oligomers such as octamethylcyclotetrasiloxane.

Additionally, in the present invention, titanium alkoxide, zirconium alkoxide and the condensation products or the chelated products of these compounds can be used in combination with the above-described hydrolyzable silicon compound (b1). By using these compounds in combination, an organic-inorganic hybrid substance excellent in properties such as water resistance and hardness can be formed from the aqueous organic-inorganic hybrid composition of the present invention.

Specific examples of the above-described titanium alkoxide include tetramethoxytitanium, tetraethoxytitanium, tetraisopropoxytitanium, tetra-n-propoxytitanium, tetra-n-butoxytitanium, tetra-sec-butoxytitanium and tetra-tert-butoxytitanium.

When the titanium alkoxides are used as the condensation products, the weight average molecular weights, determined relative to polystyrene standards, of the condensation products are preferably 200 to 5000, and more preferably 300 to 1000.

Additionally, specific examples of the above-described zirconium alkoxide include tetramethoxyzirconium, tetraethoxyzirconium, tetraisopropoxyzirconium, tetra-n-propoxyzirconium, tetra-n-butoxyzirconium, tetra-sec-butoxyzirconium and tetra-tert-butoxyzirconium.

When the zirconium alkoxides are used as the condensation products, the weight average molecular weights, determined relative to polystyrene standards, of the condensation products are preferably 200 to 5000, and more preferably 300 to 1000.

Additionally, Examples of the preferable chelating agents for forming chelated products by being coordinated to free metal compounds include: alkanolamines such as diethanolamine and triethanolamine; glycols such as ethylene glycol, diethylene glycol and propylene glycol; acetylacetone; and ethyl acetoacetate, with the proviso that the molecular weight of these compounds are each 10000 or less. Highly preferably, by using these chelating agents, the polymerization rate of the hydrolyzable metal compound (b1) can be controlled, and the polymerization stability in the presence of water and an emulsifier is made excellent. In this case, when the chelating agent is used in a ratio of 0.1 to 2 moles per 1 mole of the metal atom of the free metal compound made to coordinate with the chelating agent, preferably the effect of the chelating agent is large.

Examples of the secondary and/or tertiary amide group-containing vinyl monomer (b2) used for producing the polymer emulsion particle (B) of the present invention may include N-alkyl- or N-alkylene-substituted (meth)acrylamides; specific examples of such (meth)acrylamides may include: N-methylacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-methyl-N-ethylmethacrylamide, N-isopropylacrylamide, N-n-propylacrylamide, N-isopropylmethacrylamide, N-n-propylmethacrylamide, N-methyl-N-n-propylacrylamide, N-methyl-N-isopropylacrylamide, N-acryloylpyrrolidine, N-methacryloylpyrrolidine, N-acryloylpiperidine, N-methacryloylpiperidine, N-acryloylhexahydroazepine, N-acryloylmorphorine, N-methacryloylmorphorine, N-vinylpyrrolidone, N-vinylcaprolactam, N,N'-methylenebisacrylamide, N,N'-methylenebismethacrylamide, N-vinylacetamide, diacetoneacrylamide, diacetonemethacrylamide, N-methylolacrylamide and N-methylolmethacrylamide.

For producing the polymer emulsion particle (B) of the present invention, the secondary and/or tertiary amide group-containing vinyl monomer (b2) is used; among others, use of the tertiary amide group-containing vinyl monomer preferably strengthens the hydrogen bonding.

Highly preferable among the above-described secondary and/or tertiary amide group-containing monomers (b2) is N,N-diethylacrylamide because N,N-diethylacrylamide is extremely excellent in polymerization stability in the presence of water and an emulsifier, and is also capable of forming strong hydrogen bonds with the hydroxyl groups in the polymerization product of the above-described hydrolyzable silicon compound (b1) and the hydroxyl groups in the metal oxide (A).

The used amount of the secondary and/or tertiary amide group-containing vinyl monomer (b2) is preferably 0.1 or more and 0.5 or less in terms of the mass ratio (b2)/(B) to the obtained polymer emulsion particle (B), and is preferably 0.1 or more and 1.0 or less in terms of the mass ratio (b2)/(A) to the above-described metal oxide (A). The presence of (b2) in the above specified ranges is preferable because such ranges make compatible with each other the hydrogen bond strength and the mixing stability with the metal oxide (A).

Additionally, in the present invention, polymerization of the secondary and/or tertiary amide group-containing vinyl monomer (b2) performed together with an additional vinyl monomer (b3) copolymerizable with (b2) is preferable because such polymerization permits controlling the properties (such as the glass transition temperature, molecular weight, hydrogen bond strength, polarity, dispersion stability, weather resistance and compatibility of the polymerization product with the hydrolyzable silicon compound (b1)) of the produced polymerization product.

Examples of the vinyl monomer (b3) may include acrylic acid esters, methacrylic acid esters, aromatic vinyl compounds and vinyl cyanides, and additionally, functional group-containing monomers such as carboxyl group-containing vinyl monomers, hydroxyl group-containing vinyl monomers, epoxy group-containing vinyl monomers, carbonyl group-containing vinyl monomers and anionic vinyl monomers.

Examples of the (meth)acrylic acid esters include alkyl (meth)acrylates having 1 to 50 carbon atoms in the alkyl group and (poly)oxyethylene di(meth)acrylates having 1 to 100 ethylene oxide groups. Specific examples of the (meth) acrylic acid esters include methyl(meth)acrylate, ethyl(meth) acrylate, n-butyl(meth)acrylate, 2-ethylhexyl(meth)acrylate, methylcyclohexyl(meth)acrylate, cyclohexyl(meth)acrylate, lauryl(meth)acrylate and dodecyl(meth)acrylate. Specific examples of the (poly)oxyethylene di(meth)acrylates include ethylene glycol di(meth)acrylate, diethylene glycol di(meth) acrylate, diethylene glycol methoxy(meth)acrylate and tetraethylene glycol di(meth)acrylate.

It is to be noted that (meth)acryl as referred to in the present description is a simplified notation for methacryl or acryl.

The used amount of the (meth)acrylic acid ester, as a single compound or a mixture of two or more compounds, accounts preferably for 0 to 99.9% by mass and more preferably for 5 to 80% by mass of the total amount of the vinyl monomers.

Examples of the carboxyl group-containing vinyl monomers include acrylic acid, methacrylic acid, crotonic acid, itaconic acid, maleic acid, fumaric acid and maleic anhydride, or half esters of dibasic acids such as itaconic acid, maleic acid and fumaric acid. By using the carboxyl group-containing vinyl monomer, carboxyl groups can be introduced into the polymer emulsion particle (B), and thus the polymer emulsion particle can be improved in the stability as an emulsion and can be made to have resistance to the external effect to cause dispersion collapse. In this case, the introduced carboxyl groups can also be partially or totally neutralized with ammonia, amines such as triethylamine and dimethylethanolamine, or bases such as NaOH and KOH.

The used amount of the carboxyl group-containing vinyl monomer, as a single compound or a mixture of two or more compounds, accounts preferably for 0 to 50% by mass, more preferably 0.1 to 10% by mass and furthermore preferably 0.1 to 5% by mass of the total amount of the vinyl monomers from the viewpoint of water resistance.

Additionally, examples of the hydroxyl group-containing vinyl monomers may include: hydroxyalkyl(meth)acrylates such as 2-hydroxyethyl(meth)acrylate, 2-hydroxypropyl (meth)acrylate, 3-hydroxypropyl(meth)acrylate, 2-hydroxybutyl(meth)acrylate, 3-hydroxybutyl(meth)acrylate and 4-hydroxybutyl(meth)acrylate; di-2-hydroxyethyl fumarate and mono-2-hydroxyethyl monobutyl fumarate; allyl alcohol; (poly)oxyethylene mono(meth)acrylates having 1 to 100 ethylene oxide groups and (poly)oxypropylene mono(meth) acrylates having 1 to 100 propylene oxide groups; further "Placcel FM and FA monomers" (trade names for caprolactone adduct monomers, manufactured by Daicel Chemical Industries, Ltd.); and additionally hydroxyalkyl esters of $\alpha,\beta$-ethylenically unsaturated carboxylic acids. Specific examples of the (poly)oxyethylene(meth)acrylates include ethylene glycol(meth)acrylate, ethylene glycol methoxy (meth)acrylate, diethylene glycol(meth)acrylate, diethylene glycol methoxy(meth)acrylate, tetraethylene glycol(meth) acrylate and tetraethylene glycol methoxy(meth)acrylate. Additionally, specific examples of the (poly)oxypropylene (meth)acrylates include propylene glycol(meth)acrylate, propylene glycol methoxy(meth)acrylate, dipropylene glycol (meth)acrylate, dipropylene glycol methoxy(meth)acrylate, tetrapropylene glycol(meth)acrylate and tetrapropylene glycol methoxy(meth)acrylate. By using the hydroxyl group-containing vinyl monomer, the hydrogen bond strength of the polymerization product with the secondary and/or tertiary amide group-containing vinyl monomer (b2) can be controlled, and the water dispersion stability of the polymer emulsion particle (B) can be improved.

The used amount of the above-described hydroxyl group-containing vinyl monomer, as a single compound or a mixture of two or more compounds, accounts preferably for 0 to 80% by mass, more preferably 0.1 to 50% by mass and furthermore preferably 0.1 to 10% by mass of the total amount of the vinyl monomers.

Additionally, examples of the glycidyl group-containing vinyl polymers include glycidyl(meth)acrylate, allyl glycidyl ether and allyl dimethylglycidyl ether.

When the glycidyl group-containing vinyl monomer or the carbonyl group-containing vinyl monomer is used, the polymer emulsion particle (B) has a reactivity, and by forming crosslinking with the aid of a hydrazine derivative, a carboxylic acid derivative, an isocyanate derivative or the like, an organic-inorganic hybrid substance excellent in properties such as solvent resistance can be formed. The used amount of the glycidyl group-containing vinyl monomer or the carbonyl group-containing vinyl monomer accounts preferably for 0 to 50% by mass of the total amount of the vinyl monomers.

Additionally, specific examples of the vinyl monomer (b3) other than the above-described vinyl monomers include: olefins such as (meth)acrylamide, ethylene, propylene and isobutylene; dienes such as butadiene; haloolefins such as vinyl chloride, vinylidene chloride, vinyl fluoride, tetrafluoroethylene and chlorotrifluoroethylene; vinyl carboxylates such as vinyl acetate, vinyl propionate, vinyl n-butyrate, vinyl benzoate, vinyl p-t-butylbenzoate, vinyl pivalate, vinyl 2-ethylhexanoate, vinyl versatate and vinyl laurate; isopropenyl carboxylates such as isopropenyl acetate and isopropenyl propionate; vinyl ethers such as ethyl vinyl ether, isobutyl vinyl ether and cyclohexyl vinyl ether; aromatic vinyl compounds such as styrene and vinyltoluene; allyl esters such as allyl acetate and allyl benzoate; allyl ethers such as allyl ethyl ether and allyl phenyl ether; further, 4-(meth)acryloyloxy-2,2,6,6-tetramethylpiperidine, 4-(meth)acryloyloxy-1,2,2,6,6-pentamethylpiperidine, perfluoromethyl(meth)acrylate, perfluoropropyl(meth)acrylate, perfluoropropylmethyl(meth)acrylate, vinylpyrrolidone, trimethylolpropane tri(meth)acrylate and allyl(meth)acrylate; and combinations of these compounds.

In the present invention, a chain transfer agent may be used for the purpose of controlling the molecular weight of the polymerization product of the secondary and/or tertiary amide group-containing vinyl monomer (b2) (according to need, the above-described vinyl monomer (b3) copolymerizable with the vinyl monomer (b2) may also be used).

Examples of such a chain transfer agent may include: alkylmercaptans such as n-octylmercaptan, n-dodecylmercaptan and t-dodecylmercaptan; aromatic mercaptans such as benzylmercaptan and dodecylbenzylmercaptan; thiocarboxylic acids such as thiomalic acid, salts thereof and alkyl esters thereof; polythiols; diisopropyl xanthogen disulfide, di(methylenetrimethylolpropane) xanthogen disulfide and thioglycol; and allyl compounds such as α-methylstyrene dimer.

The used amount of the chain transfer agent can be set to fall within a range preferably from 0.001 to 30% by mass and more preferably from 0.05 to 10% by mass of the total amount of the vinyl monomers.

Examples of the emulsifier usable in the synthesis of the polymer emulsion particle (B) in the present invention may include: acidic emulsifiers such as alkylbenzenesulfonic acid, alkylsulfonic acid, alkylsulfosuccinic acid, polyoxyethylenealkyl sulfuric acid, polyoxyethylenealkylaryl sulfuric acid and polyoxyethylenedistyryl phenyl ether sulfonic acid; alkali metal (such as Li, Na or K) salts of the acidic emulsifiers; ammonium salts of the acidic emulsifiers; anionic surfactants such as fatty acid soaps; quaternary ammonium salts such as alkyltrimethylammonium bromide, alkylpyridinium bromide and imidazolinium laurate; cationic surfactants such as pyridinium salts and imidazolinium salts; nonionic surfactants such as polyoxyethylenealkyl aryl ether, polyoxyethylenesorbitan fatty acid ester, polyoxyethylene-oxypropylene block copolymer and polyoxyethylenedistyryl phenyl ether; and reactive emulsifiers having a radically polymerizable double bond.

Selection of the reactive emulsifiers having a radically polymerizable double bond among these emulsifiers is highly preferable because such selection makes highly satisfactory the water dispersion stability of the polymer emulsion particle (B) of the present invention, and permits forming an organic-inorganic hybrid substance excellent in properties such as water resistance, chemical resistance, optical properties and strength from the aqueous organic-inorganic hybrid composition of the present invention containing the polymer emulsion particle (B).

Examples of the reactive emulsifiers having a radically polymerizable double bond may include: sulfonic acid group- or sulfonate group-containing vinyl monomers; sulfuric acid ester group-containing vinyl monomers, and the alkali metal salts and ammonium salts of these; nonionic group-containing vinyl monomers such as polyoxyethylene; and quaternary ammonium salt-containing vinyl monomers.

Specific examples of the reactive emulsifiers, in particular, the sulfonic acid group- or sulfonate group-containing monomers include: a compound that has a radically polymerizable double bond and has a substituent selected from the group consisting of an alkyl group having 1 to 20 carbon atoms, an alkyl ether group having 2 to 4 carbon atoms, a polyalkyl ether group having 2 to 4 carbon atoms, an aryl group having 6 or 10 carbon atoms and a succinic acid group, partially substituted with the groups being an ammonium salt, a sodium salt or a potassium salt of the sulfonic acid group; or a vinyl sulfonate compound that has a vinyl group to which bonded is a group being an ammonium salt, a sodium salt or a potassium salt of the sulfonic acid group. The sulfuric acid ester group-containing vinyl monomer is a compound that has a radically polymerizable double bond, and has a substituent selected from the group consisting of an alkyl group having 1 to 20 carbon atoms, an alkyl ether group having 2 to 4 carbon atoms, a polyalkyl ether group having 2 to 4 carbon atoms and an aryl group having 6 or 10 carbon atoms, partially substituted with the groups being an ammonium salt, a sodium salt or a potassium salt of the sulfuric acid ester group.

Specific examples of the compound that has a succinic acid group partially substituted with the groups being an ammonium salt, a sodium salt or a potassium salt of the sulfonic acid group include allyl sulfosuccinates. Specific examples of the allyl sulfosuccinates include Eleminol JS-2 (trade name) (manufactured by Sanyo Chemical Industries, Ltd.), and Latemul S-120, S-180A and S-180 (trade names) (manufactured by Kao Corp.).

Additionally, specific examples of the compounds having an alkyl ether group having 2 to 4 carbon atoms or a polyalkyl ether group having 2 to 4 carbon atoms partially substituted with the groups being an ammonium salt, a sodium salt or a potassium salt of the sulfonic acid group include AQUARON HS-10 or KH-1025 (trade name) (manufactured by Dai-ichi Kogyo Seiyaku Co., Ltd.), and ADEKA REASOAP SE-1025N or SR-1025 (trade name) (manufactured by Asahi Denka Kogyo, Co., Ltd.).

Further, specific examples of the compound having an aryl group partially substituted with a sulfonate group include an ammonium salt, a sodium salt and a potassium salt of p-styrenesulfonic acid.

Examples of the vinyl sulfonate compound that has a vinyl group to which bonded is a group being an ammonium salt, a sodium salt or a potassium salt of the sulfonic acid group include the ammonium salts, sodium salts and potassium salts of alkylsulfonic acid(meth)acrylates such as 2-sulfoethyl acrylate, methylpropanesulfonic acid(meth)acrylamide and allylsulfonic acid.

Additionally, examples of the compound having an alkyl ether group having 2 to 4 carbon atoms or a polyalkyl ether group having 2 to 4 carbon atoms partially substituted with an ammonium salt, a sodium salt or a potassium salt of the sulfuric acid ester group include compounds having an alkyl ether group partially substituted with a sulfonate group.

Additionally, specific examples of the nonionic group-containing vinyl monomers include: α-[1-[(allyloxy)methyl]-2-(nonylphenoxy)ethyl]-ω-hydroxypolyoxyethylene (trade name: ADEKA REASOAP NE-20, NE-30, NE-40 and so on; manufactured by Asahi Denka Kogyo Co., Ltd.) and polyoxyethylene alkyl propenylphenyl ether (trade name: AQUARON RN-10, RN-20, RN-30, RN-50 and so on; manufactured by Dai-ichi Seiyaku Kogyo Co., Ltd.).

The used amount of the emulsifier is appropriately set to fall within a range of 10 parts by mass or less, and in particular, preferably set to fall within a range from 0.001 to 5 parts by mass in relation to 100 parts by mass of the polymer emulsion particle (B).

In addition to the emulsifier, a dispersion stabilizer may also be used for the purpose of improving the water dispersion stability of the polymer emulsion particle (B) of the present invention. Examples of the dispersion stabilizer include various synthetic or natural, water-soluble or water-dispersible, water-soluble polymer substances such as various water soluble oligomers selected from the group consisting of polycarboxylic acids and sulfonic acid salts, polyvinyl alcohol, hydroxyethyl cellulose, starch, maleinated polybutadiene, maleinated alkyd resin, polyacrylic acid (polyacrylic acid salt), polyacrylamide and water-soluble or water-dispersible acrylic resin; and these compounds may be used each alone or as mixtures of two or more thereof.

When these dispersion stabilizers are used, the used amount of each of them is appropriately set to fall within a range of 10 parts by mass or less, and in particular, preferably set to fall within a range from 0.001 to 5 parts by mass in relation to 100 parts by mass of the polymer emulsion particle (B).

In the present invention, it is preferable to conduct the polymerization of the hydrolyzable silicon compound (b1) and the secondary and/or tertiary amide group-containing vinyl monomer (b2) in the presence of a polymerization catalyst.

Here, specific examples of the polymerization catalyst for the hydrolyzable silicon compound (b1) include: hydrogen halides such as hydrochloric acid and hydrofluoric acid; carboxylic acids such as acetic acid, trichloroacetic acid, trifluoroacetic acid and lactic acid; sulfuric acid and sulfonic acids such as p-toluenesulfonic acid; acid emulsifiers such as alkylbenzenesulfonic acid, alkylsulfonic acid, alkylsulfosuccinic acid, polyoxyethylenealkyl sulfuric acid, polyoxyethylenealkylaryl sulfuric acid and polyoxyethylenedistyryl phenyl ether sulfonic acid; acidic or weakly acidic inorganic salts; acidic compounds such as phthalic acid, phosphoric acid and nitric acid; basic compounds such as sodium hydroxide, potassium hydroxide, sodium methylate, sodium acetate, tetramethylammonium chloride, tetramethylammonium hydroxide, tributylamine, diazabicycloundecene, ethylenediamine, diethylenetriamine, ethanolamines, γ-aminopropyltrimethoxysilane and γ-(2-aminoethyl)-aminopropyltrimethoxysilane; and tin compounds such as dibutyltin octylate and dibutyltin dilaurate.

Highly preferable as the polymerization catalyst of the hydrolyzable silicon compound (b1) among these are acidic emulsifiers that have not only functions as polymerization catalysts but also functions as emulsifiers, in particular, alkylbenzenesulfonic acids having 5 to 30 carbon atoms (such as dodecylbenzenesulfonic acid).

On the other hand, as the polymerization catalyst for the secondary and/or tertiary amide group-containing vinyl monomer (b2), preferable are radical polymerization catalysts which cause addition polymerization of vinyl monomers through radical decomposition with the aid of heat or reductive substances, and used are the compounds such as water-soluble or oil-soluble persulfuric acid salts, peroxides and azobis compounds. Examples of such compounds include potassium persulfate, sodium persulfate, ammonium persulfate, hydrogen peroxide, t-butyl hydroperoxide, t-butyl peroxybenzoate, 2,2-azobisisobutyronitrile, 2,2-azobis(2-diaminopropane) hydrochloride and 2,2-azobis(2,4-dimethylvaleronitrile), and the mixed amount of such a compound is preferably 0.001 to 5 parts by mass in relation to 100 parts by mass of the total amount of the vinyl monomers.

When the acceleration of polymerization rate and the polymerization at low temperatures of 70° C. or lower are desired, it is advantageous to use in combination with the radical polymerization catalyst a reducing agent such as sodium bisulfite, ferrous chloride, ascorbic acid salt or rongalit.

As described above, the polymer emulsion particle (B) used in the aqueous organic-inorganic hybrid composition of the present invention can be obtained by polymerizing the hydrolyzable silicon compound (b1) and the secondary and/or tertiary amide group-containing vinyl monomer (b2) (according to need, the additional vinyl monomer (b3) copolymerizable with the vinyl monomer (b2) may also be used) in the presence of water and an emulsifier, and preferably in the presence of a polymerization catalyst.

In this case, the polymerization of the hydrolyzable silicon compound (b1) and the polymerization of the secondary and/or tertiary amide group-containing vinyl monomer (b2) can be performed separately; however, simultaneous performance of these polymerizations is preferable because microscopic organic-inorganic hybridization due to hydrogen bonding and the like can thereby be achieved.

Additionally, in the present invention, it is important that the particle size of the polymer emulsion particle (B) is 10 to 800 nm. Only when the particle size of the polymer emulsion particle (B) is controlled so as to fall within such a range and the polymer emulsion particle (B) is combined with the metal oxide (A) of 1 to 400 nm in particle size to form an aqueous organic-inorganic hybrid composition, it is enabled to form an organic-inorganic hybrid substance excellent in properties such as weather resistance, chemical resistance, optical properties, and additionally, antifouling property, antifogging property and antistatic property. Additionally, the particle size of the polymer emulsion particle (B) falling within a range from 50 to 300 nm is preferable because such a particle size improves the transparency of the obtained coating film.

Most optimal as a method for obtaining the polymer emulsion particle (B) having such a particle size is a so-called emulsion polymerization in which the hydrolyzable metal compound (b1) and the secondary and/or tertiary amide group-containing vinyl monomer (b2) are polymerized in the presence of water in an amount sufficient for the emulsifier to form micelles.

The way of the emulsion polymerization is, for example, as follows. The hydrolyzable silicon compound (b1) and the secondary and/or tertiary amide group-containing vinyl monomer (b2) (and, according to need, the additional vinyl monomer (b3) copolymerizable with the vinyl monomer (b2)) are placed, as they are or in emulsified condition, and all at once or in fractions, or continuously dropwise, in a reaction vessel, and are recommended to be polymerized in the presence of the polymerization catalyst preferably under a pressure ranging from atmospheric pressure to, according to need, 10 MPa and at reaction temperatures of approximately 30 to 150° C. The polymerization may be carried out under pressures equal to or larger than the above-described pressure range and at temperatures equal to or lower than the above-described temperature range, as the case may be, without causing any trouble. The ratio of the sum of the amount of the hydrolyzable silicon compound (b1) and the total amount of the vinyl monomers to water is set so as for the final solid content amount to fall within a range from 0.1 to 70% by mass, and preferably within a range from 1 to 55% by mass. Additionally, the seed polymerization method may also be adopted in which for the purpose of growing or controlling the particle size in performing the emulsion polymerization, the emulsion particles are beforehand made to present in the water phase and then the polymerization is performed. The polymerization reaction is recommended to be made to proceed with the pH of the reaction system ranging preferably from 1.0 to 10.0, and more preferably from 1.0 to 6.0. The pH can be regulated by using pH buffer agents such as disodium phosphate, borax, sodium hydrogen carbonate and ammonia.

Also applicable as a method for obtaining the polymer emulsion particle (B) of the present invention is a method in which the hydrolyzable metal compound (b1) and the secondary and/or tertiary amide group-containing vinyl monomer (b2) are polymerized in the presence of water and an emulsifier required for polymerizing the hydrolyzable silicon compound (b1), and according to need, in the presence of a solvent, and thereafter, water is added until the polymerization product turns into emulsion; however, this method finds difficulty in controlling the particle size of the obtained polymer emulsion particle (B), as compared to the above-described emulsion polymerization method.

In the present invention, when the polymer emulsion particle (B) is a core/shell structure formed with two or more layers, preferably an organic-inorganic hybrid substance excellent in mechanical physical properties (such as the balance between the strength and the flexibility) can be formed from the aqueous organic-inorganic hybrid composition containing the polymer emulsion particle (B). In particular, when the mass ratio (b2)/(b1) of the secondary and/or tertiary amide group-containing vinyl monomer (b2) to the hydrolyzable silicon compound (b1) in the innermost layer of the core/shell structure is 1.0 or less, and the mass ratio (b2)/(b1) in the outermost layer is 0.1 or more and 5.0 or less, preferably the obtained hybrid substance is particularly satisfactory both in weather resistance and in mechanical physical properties.

As the method for producing the polymer emulsion particle (B) having a core/shell structure, a multistage emulsion polymerization is extremely useful.

The multistage emulsion polymerization as referred to herein means a polymerization in which two or more different compositions of the hydrolyzable silicon compounds (b1) and two or more different compositions of the secondary and/or tertiary amide group-containing vinyl monomers (b2) (and, according to need, the additional vinyl monomer (b3) copolymerizable with the vinyl monomer (b2)) are prepared, and these silicon compounds and the vinyl monomers are polymerized in separate stages.

Hereinafter, the synthesis of the polymer emulsion particle (B) based on a multistage emulsion polymerization of the present invention is described by taking as an example a synthesis of the polymer emulsion particle (B) based on a two-stage emulsion polymerization that is simplest among multistage polymerizations and useful.

In the present invention, as an example of the synthesis of the polymer emulsion particle (B) based on a two-stage emulsion polymerization, a method may be described in which, in the presence of the seed particles obtained by polymerizing a vinyl monomer (C) and/or the hydrolyzable silicon compound (b1) in the presence of water and an emulsifier, the hydrolyzable silicon compound (b1) and the secondary and/or tertiary amide group-containing vinyl monomer (b2) are polymerized.

The vinyl monomer (C) as referred to herein means the secondary and/or tertiary amide group-containing vinyl monomer (b2) and/or the above-described additional vinyl monomer (b3).

The synthesis of the polymer emulsion particle (B) based on the above-described two-stage emulsion polymerization is conducted by a two-stage polymerization process consisting of a first stage polymerization in which a first serial material set (the vinyl monomer (C) and/or the hydrolyzable metal compound (b1)) is fed to be emulsion-polymerized, and a successive second stage polymerization in which a second serial material set (the hydrolyzable metal compound (b1) and/or the secondary and/or tertiary amide group-containing vinyl monomer (b2) (and, according to need, the additional vinyl monomer (b3) copolymerizable with the vinyl monomer (b2))) is fed to be emulsion-polymerized in an aqueous medium. In this case, the mass ratio of the solid content mass (M1) in the first serial material set to the solid content mass (M2) in the second serial material set is set to satisfy preferably (M1)/(M2)=9/1 to 1/9, and more preferably (M1)/(M2)=8/2 to 2/8.

In the present invention, the features of the polymer having a preferable core/shell structure may include the fact that the particle size of the seed particles obtained in the first stage polymerization is increased (particle size increase) by the second stage polymerization without causing any significant change (preferably in a monodisperse condition) of the particle size distribution (volume average particle size/number average particle size).

Additionally, an identification of the core/shell structure can be carried out, for example, by a morphological observation by means of an apparatus such as a transmission electron microscope or by an analysis based on a viscoelastic measurement.

For the purpose of preparing the polymer emulsion particle (B), because of excellent polymerization stability, preferable is the case where the hydrolyzable silicon compound (b1) and the secondary and/or tertiary amide group-containing vinyl monomer (b2) are polymerized in the presence of the seed particles obtained by polymerizing the hydrolyzable silicon compound (b1) in the presence of water and an emulsifier.

Additionally, preferable is the polymer emulsion particle (B) having the above-described core/shell structure in which the glass transition temperature (Tg) of the core phase is 0° or lower, that is, the glass transition temperature of the seed particles is 0° or lower because from the aqueous organic-inorganic hybrid composition containing such a polymer emulsion particle (B), there can be formed an organic-inorganic hybrid substance excellent in flexibility at room temperature and hardly susceptible to cracking or the like.

When a multistage emulsion polymerization including three or more stages is implemented in the present invention, it is only required to increase the number of the serial material sets with reference to the above-described synthesis example of the polymer emulsion particle (B) based on a two-stage polymerization.

The aqueous organic-inorganic hybrid composition of the present invention is characterized by including the above-described metal oxide (A) having a particle size of 1 to 400 nm and the above-described polymer emulsion particle (B) having a particle size of 10 to 800 nm, obtained by polymerizing the hydrolyzable silicon compound (b1) and the secondary and/or tertiary amide group-containing vinyl monomer (b2) in the presence of water and an emulsifier.

Here, the mass ratio (A)/(B) of the metal oxide (A) to the polymer emulsion particle (B) is 1/99 to 99/1, preferably 5/95 to 90/10 and more preferably 9/91 to 83/17. From the organic-inorganic hybrid composition having a mixing ratio falling within the above-described ranges, preferably an organic-inorganic hybrid substance excellent in transparency and stain resistance can be obtained.

The aqueous organic-inorganic hybrid composition of the present invention may be either in a solvent-free condition or in a water-dispersed condition, without any particular constraint on such condition; however, when the composition concerned is used as a coating agent, a water-dispersed condition is preferable from the viewpoint of regulating the viscosity. In this case, the solid content of the aqueous organic-inorganic hybrid composition is preferably 0.01 to 60% by mass and more preferably 1 to 40% by mass. The viscosity in this case is preferably 0.1 to 100000 mPa·s and preferably 1 to 10000 mPa·s at 20° C.

Additionally, alcohols may be added to the aqueous organic-inorganic hybrid composition of the present invention, for the purpose of controlling the interaction between the metal oxide (A) and the polymer emulsion particle (B) due to hydrogen bonding and the like. Addition of an alcohol highly improves properties such as storage stability.

Preferable as the above-described alcohols are methanol, ethanol, 1-propanol, 2-propanol, 1-butanol, 2-butanol, denatured ethanol, glycerin, monoalkyl monoglyceryl ethers having 3 to 8 carbon atoms in the alkyl chain, propylene glycol monomethyl ether, diethylene glycol monobutyl ether, propylene glycol monoethyl ether, propylene glycol monobutyl ether, dipropylene glycol monoethyl ether, dipropylene glycol monobutyl ether and di- to tetraethylene glycol monophenyl ether. Among these, ethanol is most preferable from the environmental viewpoint.

For the aqueous organic-inorganic hybrid composition of the present invention, there can be used as an ultraviolet absorber, at least one selected from the group consisting of benzophenone ultraviolet absorbers, benzotriazole ultraviolet absorbers and triazine ultraviolet absorbers, and as a light stabilizer, at least one selected from the group consisting of hindered amine light stabilizers. The ultraviolet absorber and/or the light stabilizer is preferably used in an amount of 0.1% by mass to 5% by mass in relation to the mass of the polymer emulsion particle (B). Additionally, there can also be used as the ultraviolet absorber, a radically polymerizable ultraviolet absorber having in the molecule thereof a radically polymerizable double bond, and as the light stabilizer, a radically polymerizable light stabilizer having in the molecule thereof a radically polymerizable double bond. Additionally, combined use of the ultraviolet absorber and the light stabilizer is preferable because when a hybrid substance is formed by using the thus obtained organic-inorganic hybrid composition, the obtained hybrid substance is excellent in weather resistance.

These ultraviolet absorber and light stabilizer may be simply mixed with the metal oxide (A) and the polymer emulsion particle (B), or may also be made to be concomitantly present when the polymer emulsion particle (B) is synthesized.

Specific examples of the benzophenone ultraviolet absorbers usable in the present invention include: 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, bis(5-benzoyl-4-hydroxy-2-methoxyphenyl)methane, 2,2'-dihydroxy-4-methoxybenzophenone, 2,2'-dihydroxy-4,4'-dimethoxybenzophenone, 2,2',4,4'-tetrahydroxybenzophenone, 4-dodecyloxy-2-hydroxybenzophenone, 2-hydroxy-4-methoxy-2'-carboxybenzophenone and 2-hydroxy-4-stearyloxybenzophenone. Specific examples of the radically polymerizable benzophenone ultraviolet absorbers include: 2-hydroxy-4-acryloxybenzophenone, 2-hydroxy-4-methacryloxybenzophenone, 2-hydroxy-5-acryloxybenzophenone, 2-hydroxy-5-methacrloxybenzophenone, 2-hydroxy-4-(acryloxyethoxy)benzophenone, 2-hydroxy-4-(methacryloxyethoxy)benzophenone, 2-hydroxy-4-(methacryloxydiethoxy)benzophenone and 2-hydroxy-4-(acryloxytriethoxy)benzophenone.

Specific examples of the benzotriazole ultraviolet absorbers usable in the present invention include: 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-5-tert-octylphenyl)benzotriazole, 2-(2-hydroxy-3,5-di-tert-octylphenyl)benzotriazole, 2-[2'-hydroxy-3',5'-bis(α,α'-dimethylbenzyl)phenyl]benzotriazole, a condensate between methyl-3-[3-tert-butyl-5-(2H-benzotriazol-2-yl)-4-hydroxyphenyl] propionate and polyethylene glycol (molecular weight: 300) (trade name: TINUVIN 1130, manufactured by Nihon Ciba-Geigy K.K.), isooctyl-3-[3-(2H-benzotriazol-2-yl)-5-tert-butyl-4-hydroxyphenyl]propionate (trade name: TINUVIN 384, manufactured by Nihon Ciba-Geigy K.K.), 2-(3-dodecyl-5-methyl-2-hydroxyphenyl)benzotriazole (trade name: TINUVIN 571, manufactured by Nihon Ciba-Geigy K.K.), 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6"-tetrahydrophthalimidemethyl)-5'-methylphenyl]benzotriazole, 2,2-methylenebis[4-(1,1,3,3-tetramethylbutyl)-6-(2H-benzotriazol-2-yl)phenol], and 2-(2H-benzotriazol-2-yl)-4,6-bis(1-methyl-1-phenylethyl)phenol (trade name: TINUVIN 900, manufactured by Nihon Ciba-Geigy K.K.). Specific examples of the radically polymerizable benzotriazole ultraviolet absorbers include: 2-(2'-hydroxy-5'-methacryloxyethylphenyl)-2H-benzotriazole (trade name: RUVA-93, manufactured by Otsuka Chemical Co., Ltd.), 2-(2'-hydroxy-5'-methacryloxyethyl-3-tert-butylphenyl)-2H-benzotriazole, 2-(2'-hydroxy-5'-methacryloxypropyl-3-tert-butylphenyl)-5-chloro-2H-benzotriazole, and 3-methacryloyl-2-hydroxypropyl-3-[3'-(2"-benzotriazolyl)-4-hydroxy-5-tert-butyl]phenyl propionate (trade name: CGL-104, manufactured by Nihon Ciba-Geigy K.K.).

Specific examples of the triazine ultraviolet absorbers usable in the present invention include TINUVIN 400 (trade name, manufactured by Nihon Ciba-Geigy K.K.).

Preferable as the ultraviolet absorbers usable in the present invention are the benzotriazole ultraviolet absorbers and triazine ultraviolet absorbers which are high in ultraviolet absorption capacity.

Specific examples of the hindered amine light stabilizers usable in the present invention include: bis(2,2,6,6-tetramethyl-4-piperidyl) succinate, bis(2,2,6,6-tetramethylpiperidyl) sebacate, bis(1,2,2,6,6-pentamethyl-4-piperidyl)-2-(3,5-di-tert-butyl-4-hydroxybenzyl)-2-butyl malonate, 1-[2-[3-(3,5-di-tert-butyl-4-hydroxyphenyl)propynyloxy]ethyl]-4-[3-(3,5-di-tert-butyl-4-hydroxyphenyl)propynyloxy]-2,2,6,6-tetramethylpiperidine, a mixture composed of bis(1,2,2,6,6-pentamethyl-4-piperidyl) sebacate and methyl-1,2,2,6,6-pentamethyl-4-piperidyl sebacate (trade name: TINUVIN 292, manufactured by Nihon Ciba Geigy K.K.), and bis(1-octoxy-2,2,6,6-tetramethyl-4-piperidyl) sebacate, TINUVIN 123 (trade name, manufactured by Nihon Ciba Geigy K.K.). Specific examples of the radically polymerizable hindered amine light stabilizers include: 1,2,2,6,6-pentamethyl-4-piperidyl methacrylate, 1,2,2,6,6-pentamethyl-4-piperidyl acrylate, 2,2,6,6-tetramethyl-4-piperidyl methacrylate, 2,2,6,6-tetramethyl-4-piperidyl acrylate, 1,2,2,6,6-pentamethyl-4-iminopiperidyl methacrylate, 2,2,6,6-tetramethyl-4-iminopiperidyl methacrylate, 4-cyano-2,2,6,6-tetramethyl-4-piperidyl methacrylate, and 4-cyano-1,2,2,6,6-pentamethyl-4-piperidyl methacrylate.

Preferable as the hindered amine light stabilizers usable in the present invention are the light stabilizers low in basicity;

specifically, preferable are hindered amine light stabilizers of 8 or more in basicity constant (pKb).

Additionally, additive ingredients usually mixed in coating compositions and resins for use in molding may be mixed in the aqueous organic-inorganic hybrid composition of the present invention, according to the applications and usages thereof; for example, the following additives may be selected and combined according to respective purposes to be mixed in the above-described composition: thickeners, leveling agents, thixotropic agents, antifoaming agents, freeze stabilizers, delustering agents, crosslinking reaction catalysts, pigments, curing catalysts, crosslinking agents, fillers, antiskinning agents, dispersants, moistening agents, light stabilizers, antioxidants, ultraviolet absorbers, rheology controlling agents, antifoaming agents, film forming aids, antirust agents, dyes, plasticizers, lubricants, reductants, antiseptic agents, mildewcides, deodorants, antiyellowing agents, antistatic agents and electrification controlling agents.

The aqueous organic-inorganic hybrid composition of the present invention can be widely used as coating compositions, finishing materials for building materials, adhesives, tackifiers, paper processing agents, and finishing materials for woven and nonwoven fabric, further, sealants, adhesives, inks, coating materials, casting materials, elastomers, foams, plastic raw materials, and fiber processing agents.

From the aqueous organic-inorganic hybrid composition of the present invention, there can be formed an organic-inorganic hybrid substance in a coating film-like, sheet-like, fibrous or molded form.

The aqueous organic-inorganic hybrid composition of the present invention is extremely excellent in properties such as weather resistance and chemical resistance, and additionally, has a water contact angle at 23° C. of 60° or less so as to be excellent also in antifouling property. In particular, when silicon dioxide and/or a photocatalytically active metal oxide (photocatalyst) is used as the metal oxide (A), the water contact angle at 23° C. comes to be 30° or less so as to be excellent in properties such as antifouling property, antifogging property and antistatic property.

Additionally, the organic-inorganic hybrid substance obtained by using a photocatalyst as the metal oxide (A) exhibits excellent decomposition activity for staining organic substances and stain resistance against staining organic substances, and further, photoelectric conversion function by irradiation of light having an energy higher than the band gap energy of the photocatalyst contained therein.

In this connection, as a light source for light having energy higher than the band gap energy of the photocatalyst, there can be used sunlight, light available under the general housing conditions such as interior lamps, and additionally, light obtained from black lights, xenon lamps, mercury lamps, LEDs and the like.

Additionally, the organic-inorganic hybrid substance obtained by using a conductive metal oxide as the metal oxide (A) exhibits excellent conductive capability, antistatic capability, electromagnetic wave blocking capability and surface heat emitting capability.

In the present invention, it is preferable to form an organic-inorganic hybrid substance under the condition that the metal oxide (A) effectively functions as a curing agent for the polymer emulsion particle (B). Examples of such a preferable organic-inorganic hybrid substance may include a form in which the metal oxide (A) is present to form a continuous layer between the particles of the polymer emulsion particle (B) while interacting with the polymer emulsion particle (B). Such a form of organic-inorganic hybrid substance is particularly excellent in properties such as chemical resistance and optical properties.

For the purpose of forming such a form of organic-inorganic hybrid substance as described above, it is most effective to set the mass ratio (A)/(B) of the metal oxide (A) to the polymer emulsion particle (B) in the aqueous organic-inorganic hybrid composition so as to fall within an optimal range. The optimal range of the mass ratio (A)/(B) can be determined, for example, by measuring the transparencies of the organic-inorganic hybrid substances produced from the aqueous organic-inorganic hybrid compositions obtained by varying the mass ratio (A)/(B), and by specifying the mass ratio (A)/(B) range giving relatively satisfactory transparency. The optimal mass ratio (A)/(B) range for the used metal oxide (A) and the used polymer emulsion particle (B) is preferably such that the order of magnitude difference between the surface area (SA) of the metal oxide (A) and the surface area (SB) of the polymer emulsion particle (B) is three or less. The surface areas can be calculated respectively from the particle sizes and mixed mass values of the metal oxide (A) and the polymer emulsion particle (B).

In the present invention, the most preferable form of the organic-inorganic hybrid substance is such that the polymer emulsion particle (B) is a core/shell structure, and the shell phase and the metal oxide (A) form a continuous layer under the condition that the shell phase interacts with the metal oxide (A), and the particle-like core phase is present in the continuous layer. Such a form of organic-inorganic hybrid substance is excellent not only in chemical resistance and optical properties but also in mechanical properties (such as the balance between strength and flexibility).

Another embodiment of the present invention provides a functional hybrid article which has an organic-inorganic hybrid substance on a substrate.

The substrate used to obtain the functional hybrid article of the present invention is not particularly limited, and all the substrates used for the applications disclosed in the present invention can be used.

Specific examples of the substrates used to obtain the functional hybrid article of the present invention include: organic substrates made of materials such as synthetic and natural resins; inorganic substrates made of materials such as metals, ceramics, glass, stone, cement and concrete; and combinations of these substrates.

The functional hybrid article of the present invention can be obtained, for example, as follows: the aqueous organic-inorganic hybrid composition is coated on a substrate, dried, and then, according to intended purposes, subjected to an operation such as heat treatment preferably at 20° C. to 500° C., more preferably at 40° C. to 250° C. or ultraviolet light irradiation to form on a substrate a coating film of the organic-inorganic hybrid substance to yield the functional hybrid article. Examples of the coating method include a spraying method, a flow coating method, a roll coating method, a brush coating method, a dip coating method, a spin coating method, a screen printing method, a casting method, a gravure printing method and a flexographic printing method.

When the organic-inorganic hybrid substance of the present invention is formed as a coating film on a substrate, it is preferable that the thickness of the coating film is 0.05 to 100 μm, and preferably 0.1 to 10 μm. The thickness is preferably 100 μm or less from the viewpoint of transparency, and is preferably 0.05 μm or more for the purpose of developing the functions such as antifouling property, antifogging property, antistatic property, photocatalytic activity, conductivity, electromagnetic wave blocking property and surface heat emitting property.

The term of coating film as used in the present description is not necessarily required to be a continuous film, but may take forms such as a discontinuous film and an island-like dispersed film.

The production method of the functional hybrid article of the present invention is not limited to the case where the coating film of the organic-inorganic hybrid substance of the present invention is formed on a substrate. A substrate and the organic-inorganic hybrid substance of the present invention may be molded simultaneously, for example, as an integrated single piece. Alternatively, after the organic-inorganic hybrid substance of the present invention has been molded, the substrate may be molded. Yet alternatively, after the organic-inorganic hybrid substance of the present invention and the substrate have been separately molded, the molded organic-inorganic hybrid substance and the molded substrate may be adhered or fusion bonded to each other to form the functional hybrid article.

The functional hybrid article of the present invention that has on a substrate the organic-inorganic hybrid substance formed of the aqueous organic-inorganic hybrid composition containing the above-described modified metal oxide (A') has a feature that the concentration of the modified metal oxide (A') in the organic-inorganic hybrid substance is higher on the exposed side of the organic-inorganic hybrid substance than on another side, in contact with the substrate, of the organic-inorganic hybrid substance. In this connection, in the case where the modified metal oxide (A') is the modified photocatalyst (D), even when an organic substrate decomposable with a photocatalyst is used as the substrate in the functional hybrid article, the contact between the photocatalyst and the organic substrate is scarce, hence the durability of the functional hybrid article is extremely excellent, and thus a functional hybrid article having a photocatalytic function that possesses simultaneously an excellent photocatalytic activity and an excellent durability can be obtained.

The organic-inorganic hybrid substance or the functional hybrid article of the present invention that has a water contact angle at 20° C. of 60° or less (preferably 30° or less) so as to be a hydrophilic article (such as a hydrophilic film, and a substrate covered with the hydrophilic film) is applicable to techniques such as an antifogging technique to prevent the fogging of mirrors and glass, and further an antifouling technique and an antistatic technique for building exterior or the like.

Examples of the application fields in which the organic-inorganic hybrid substance or the functional hybrid article of the present invention is applied to the field of antifouling technique include: building materials, building exterior, building interior, window frames, windowpanes, structural members, building equipment for houses or the like, in particular, such as lavatory basins, bathtubs, wash basins, lighting equipment, lighting covers, kitchen equipment, tableware, dishwashers, dishdryers, sinks, cooking ranges, kitchen hoods and ventilating fans. Additionally, the organic-inorganic hybrid substance or the functional hybrid article of the present invention can be used for vehicle exterior, vehicle coating, and vehicle interior depending on the intended purposes, and is effectively used for the members required to have transparency such as lamp covers, windowpanes, gauges and indicator panels for vehicles. Yet additionally, the organic-inorganic hybrid substance or the functional hybrid article of the present invention can be used for: exterior, dust-proof covers and coating for machinery and articles; indicators and the covers thereof; traffic signs; various display systems; displays such as advertising towers; sound insulation walls for roads, railroads and the like; exterior and coating for bridges and guard rails; interior and coating for tunnels; exterior, in particular, transparent members for electronic and electric devices used outdoors such as insulators, solar cell covers and heat collecting covers for solar water heaters; exterior, in particular, transparent members for plastic greenhouses and greenhouses; and additionally, facilities and equipment used in indoor environments suffering from a fear of being fouled in spite of being indoor environments, such as facilities and equipment for medical or gymnastic purposes.

Examples of the application fields in which the organic-inorganic hybrid substance or the functional hybrid article of the present invention is applied to the field of antifogging technique include: mirrors (such as vehicle rearview mirrors, bathroom mirrors, lavatory mirrors, dental mirrors and road mirrors); lenses (such as spectacle lenses, optical lenses, lenses for lighting, lenses for semiconductors, lenses for copier and lenses for vehicle rearview cameras); prisms; windowpanes for buildings and surveillance towers; windowpanes for vehicles (such as automobiles, railcars, aircraft, ships, submarines, snow vehicles, ropeway gondolas, amusement park gondolas, and spacecrafts), a windshield for vehicles (such as automobiles, motorcycles, railcars, aircrafts, ships, submarines, snow vehicles, snowmobiles, ropeway gondolas, amusement park gondolas, and spacecrafts); protective goggles and sport goggles; shields for protective masks, shields for sport masks and shields for helmets; glass plates for frozen food display cases and glass plates for warmed food display cases; covers for measurement instruments, covers for lenses of vehicle rearview cameras, focusing lenses for dental laser therapy equipment and the like, covers for laser light detecting sensors such as intervehicular distance sensors, covers for infrared sensors and camera filters.

Examples of the application fields in which the organic-inorganic hybrid substance or the functional hybrid article of the present invention is applied to the field of antistatic technique include: cathode-ray tubes; magnetic recording media, optical recording media, magnetooptical recording media, audiotapes, videotapes and analog records; housings, parts, exterior and coating for household electric appliances; housings, parts, exterior and coating for OA instruments; building materials, building exterior, building interior, window frames, windowpanes and structural members; exterior and coating for vehicles; and exterior, coating, dust-proof covers and coating for machinery and articles.

The organic-inorganic hybrid substance or the functional hybrid article of the present invention can be applied, owing to the photocatalysis thereof, to the fields of antibacterial and mildew proofing techniques. Examples of the applications in which the organic-inorganic hybrid substance or the functional hybrid article of the present invention is applied to the above-described fields may include: building materials, building exterior, building interior, window frames, structural members, building equipment for houses or the like, in particular, such as lavatory basins, bathtubs, wash basins, lighting equipment, lighting covers, kitchen equipment, tableware, dishwashers, dishdryers, sinks, cooking ranges, kitchen hoods, ventilating fans, kitchen cabinets, display shelves; walls, ceilings and doorknobs of bathrooms and lavatories; further, applications in medical care and in public facilities such as members in hospitals and various members in ambulances, or wall surfaces, floor surfaces, ceiling surfaces, furniture and fixtures at various locations, equipment and door knobs, for the purpose of hygienic management, in food factories and pharmaceutical factories, and public facilities such as schools, gymnasiums and stations, public bathhouses, public lavatories, inns, hotels and others. In particular, the organic-inorganic hybrid substance or the functional hybrid article of the present invention can be widely used for members in hospitals as a method for preventing in-hospital infection. Examples of the members in hospitals include: floors, walls, ceilings, balustrades, doorknobs, faucets and various medical instruments in the places where a majority of unspecified persons are brought into contact with each other such as patient rooms, consultation rooms, corridors, staircases, elevators, waiting lounges and lavatories. In addition to the cases involving hospitals, the organic-inorganic hybrid substance or the functional hybrid article of the present invention can also effectively impart antibacterial function and mildew proofing function to various members in locations required to be hygienic such as ambulances, food storerooms and food-cooking rooms.

The organic-inorganic hybrid substance or the functional hybrid article of the present invention that has photocatalytic activity such as decomposition of organic substances develops various functions such as antibacterial function, antifouling function, deodorizing function and NOx decomposing function, and hence can be used in applications such as environmental sanitization for air, water and the like.

The organic-inorganic hybrid substance or the functional hybrid article of the present invention that has a photoelectric conversion function can develop functions such as solar energy conversion into electric power, and hence can be used in applications such as optical semiconductor electrodes used in (wet) solar cells.

The organic-inorganic hybrid substance or the functional hybrid article of the present invention that has conductive capability can be used in applications as transparent conductive films such as solar cells, liquid crystal display materials, electronic paper, organic EL and touch panels, and in applications as surface heat emission such as antifogging and antifrost heaters, and panel heaters for room heating.

EXAMPLES

The present invention is specifically described with reference to Examples, Referential Examples and Comparative Examples, but these Examples by no means limit the scope of the present invention. In Examples, Referential Examples and Comparative Examples, various physical properties were measured by means of the following methods.
1. Number Average Particle Size A sample was diluted by appropriately adding a solvent so as for the solid content amount to be 1 to 20% by mass, and subjected to measurement with a wet particle size analyzer (Microtrack UPA-9230, manufactured by Nikkiso Co., Ltd., Japan).
2. Coating Film Hardness The hardness was determined in conformity with JIS-K5400 as pencil hardness (scratches on the coating film).
3. Transparency A haze value and a total light transmittance were measured in conformity with JIS-K7105 with a turbidimeter NDH 2000 manufactured by Nippon Denshoku Industries Co., Ltd., Japan.
4. Water Contact Angle on the Coating Film Surface A drop of deionized water was placed on the surface of a coating film and allowed to stand at 20° C. for 1 minute, and thereafter, the water contact angle was measured with a contact angle meter CA-X150 manufactured by Kyowa Interface Science Co., Ltd., Japan.

The smaller is the water contact angle on the coating film, the higher is the hydrophilicity of the coating film surface.
5. Water Resistance A sample was immersed in water at 23° C. for 10 days, dried at 23° C. for 1 day, and the transparency was evaluated by means of the above-described method 3.
6. Weather Resistance With a sunshine weather meter manufactured by Suga Test Instruments Co., Ltd., an exposure test was conducted (black panel temperature: 63° C., rain fall 18 minutes/2 hours). The transparency and the water contact angle after an exposure time of 2000 hours were measured by means of the above-described methods 3 and 4, respectively.
7. Antifouling Property A specimen was attached to a fence facing an ordinary road (approximate truck traffic of 500 to 1000 truck trips per day) for 3 months, and thereafter the fouling degree of the specimen was visually evaluated.
8. Photocatalytic Activity The surface of a coating film was coated with a 5% by mass ethanol solution of methylene blue, and then irradiated with the light from a black light model FL20S BLB manufactured by Toshiba Litech Co., Ltd. for 3 days. In this irradiation, the ultraviolet light intensity was regulated so as to be 1 mW/cm$^2$ as measured with an ultraviolet light intensity meter model UVR-2 manufactured by Topcon Co., Ltd., Japan (a photoreceptor model UD-36 manufactured by Topcon Co., Ltd., Japan (responsive to wavelengths from 310 to 400 nm) was used as the photoreceptor).

Thereafter, on the basis of the decomposition degree of methylene blue (as visually evaluated on the basis of the fading degree of the coating film surface), the photocatalytic activity was evaluated on the basis of the following three grades.

◎(Excellent): Methylene blue is completely decomposed.
○ (Good): Blue color of methylene blue remains slightly.
X (Poor): Almost no decomposition of methylene blue is observed.
9. Observation of the Sectional Structure of a Coating Film A sample was embedded in an epoxy resin (trade name: Quetol 812), then an ultrathin slice of 50 to 60 nm in thickness was prepared with a microtome model ULTRACUT-N (trade name) manufactured by Reichert Co., Germany; the slice was placed on a mesh with a supporting film placed thereon, then subjected to carbon vapor deposition to prepare a specular specimen, and the section of the coating film was observed with a TEM.

The TEM observation conditions are as follows.
Apparatus: Model HF 2000 manufactured by Hitachi Ltd., Japan
Acceleration voltage: 125 kV
10. Ratio of Particle Length to Particle Diameter A sample was dropped on a mesh in an electron microscope to be air-dried. The sample on the mesh was observed with an ultrahigh resolution TEM, and from the observed image, 100 particles were extracted arbitrarily, and the ratio of the particle length to the particle diameter was determined.

The high resolution observation conditions are as follows.
Apparatus: Model H-9000 UHR manufactured by Hitachi Ltd., Japan
Acceleration voltage: 300 kV
Measurement magnification: ×1000000
11. Surface Resistance The surface resistance was measured with a super-insulating resistance/microammeter (TR8601, manufactured by Advantest Co., Ltd., Japan).

Referential Example 1

Synthesis of Polymer Emulsion Particle (B-1) Water Dispersion

In a reaction vessel equipped with a reflux condenser, a dropping vessel, a thermometer and a stirrer, 1600 g of ion-exchanged water and 2 g of dodecylbenzenesulfonic acid were placed, and then heated to 80° C. under stirring. Into the reaction vessel, a mixed solution composed of 86 g of butyl acrylate, 133 g of phenyltrimethoxysilane and 1.3 g of 3-methacryloxypropyltrimethoxysilane and a mixed solution composed of 137 g of diethylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1500 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-1) water dispersion having a number average particle size of 100 nm was obtained.

Referential Example 2

Synthesis of Polymer Emulsion Particle (B-2) Water Dispersion

In a reaction vessel equipped with a reflux condenser, a dropping vessel, a thermometer and a stirrer, 1000 g of ion-exchanged water and 2 g of dodecylbenzenesulfonic acid were placed, and then heated to 80° C. under stirring. Into the reaction vessel, a mixed solution composed of 86 g of butyl acrylate, 133 g of phenyltrimethoxysilane and 1.3 g of 3-methacryloxypropyltrimethoxysilane and a mixed solution composed of 13 g of diethylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1000 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-2) water dispersion having a number average particle size of 110 nm was obtained.

Referential Example 3

Synthesis of Polymer Emulsion Particle (B-3) Water Dispersion

In a reaction vessel equipped with a reflux condenser, a dropping vessel, a thermometer and a stirrer, 1600 g of ion-exchanged water and 2 g of dodecylbenzenesulfonic acid were placed, and then heated to 80° C. under stirring. Into the reaction vessel, a mixed solution composed of 86 g of butyl acrylate, 133 g of phenyltrimethoxysilane and 1.3 g of 3-methacryloxypropyltrimethoxysilane and a mixed solution composed of 137 g of N-isopropylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1500 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-3) water dispersion having a number average particle size of 105 nm was obtained.

Referential Example 4

Synthesis of Polymer Emulsion Particle (B-4) Water Dispersion

In a reaction vessel equipped with a reflux condenser, a dropping vessel, a thermometer and a stirrer, 1600 g of ion-exchanged water and 2 g of dodecylbenzenesulfonic acid were placed, and then heated to 80° C. under stirring. Into the reaction vessel, a mixed solution composed of 86 g of butyl acrylate and 133 g of phenyltrimethoxysilane and a mixed solution composed of 137 g of diethylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1500 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-4) water dispersion having a number average particle size of 120 nm was obtained.

Referential Example 5

Synthesis of Polymer Emulsion Particle (B-5) Water Dispersion

In a reaction vessel equipped with a reflux condenser, a dropping vessel, a thermometer and a stirrer, 1600 g of ion-exchanged water and 4 g of dodecylbenzenesulfonic acid were placed, and then heated to 80° C. under stirring. Into the reaction vessel, a mixed solution composed of 185 g of dimethyldimethoxysilane and 117 g of phenyltrimethoxysilane was dropwise added over approximately 2 hours under the condition that the temperature inside the reaction vessel was maintained at 80° C., and thereafter under the condition that the temperature inside the reaction vessel was 80° C., the reaction solution was continuously stirred for approximately 1 hour. Then, a mixed solution composed of 86 g of butyl acrylate, 133 g of phenyltrimethoxysilane and 1.3 g of 3-methacryloxypropyltrimethoxysilane and a mixed solution composed of 137 g of diethylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1900 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-5) water dispersion having a number average particle size of 130 nm was obtained.

Referential Example 6

Synthesis of Polymer Emulsion Particle (B-6) Water Dispersion

In a reaction vessel equipped with a reflux condenser, a dropping vessel, a thermometer and a stirrer, 1000 g of ion-exchanged water was placed, and then heated to 80° C. under stirring. Into the reaction vessel, a mixed solution composed of 137 g of diethylacrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 500 g of ion-exchanged water and 86 g of butyl acrylate were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, filtered with a 100-mesh metal gauze, then regulated with ion-exchanged water so as for the solid content to be 10.0% by mass, and thus a polymer emulsion particle (B-6) water dispersion having a number average particle size of 80 nm was obtained.

Referential Example 7

Synthesis of Polymer Emulsion Particle (B-7) Water Dispersion

In a reaction vessel equipped with a reflux condenser, a dropping vessel, a thermometer and a stirrer, 1600 g of ion-exchanged water and 2 g of dodecylbenzenesulfonic acid were placed, and then heated to 80° C. under stirring. Into the reaction vessel, a mixed solution composed of 86 g of butyl acrylate, 133 g of phenyltrimethoxysilane and 1.3 g of 3-methacryloxypropyltrimethoxysilane and a mixed solution composed of 137 g of acrylamide, 3 g of acrylic acid, 13 g of a reactive emulsifier (trade name: ADEKA REASOAP SR-1025, manufactured by Asahi Denka Kogyo Co., Ltd., aqueous solution with 25% of solid content), 40 g of a 2% by mass aqueous solution of ammonium persulfate and 1500 g of ion-exchanged water were dropwise added simultaneously over approximately 2 hours under the condition that the temperature inside the reaction vessel was maintained at 80° C. Further, under the condition that the temperature inside the reaction vessel was 80° C., the reaction solution was continuously stirred for approximately 2 hours, then cooled to room temperature, and filtered with a 100-mesh metal gauze. A polymer emulsion particle (B-7) water dispersion thus obtained had 9.1% by mass of a solid content, and unreacted acrylamide was detected in a large amount.

Referential Example 8

Synthesis of Modified Photocatalyst (D-1)

In a reaction vessel equipped with a reflux condenser, a thermometer and a stirrer, 474 g of LS-8600 [trade name for 1,3,5,7-tetramethylcyclotetrasiloxane (manufactured by Shin-Etsu Chemical Co., Ltd.)], 76.4 g of LS-8620 [trade name for octamethylcyclotetrasiloxane (manufactured by Shin-Etsu Chemical Co., Ltd.)], 408 g of LS-8490 [trade name for 1,3,5-trimethyl-1,3,5-triphenylcyclotrisiloxane (manufactured by Shin-Etsu Chemical Co., Ltd.)], 40.5 g of LS-7130 [trade name for hexamethyldisiloxane (manufactured by Shin-Etsu Chemical Co., Ltd.)] and 20 g of sulfated zirconia were placed, stirred at 50° C. for 3 hours, and further stirred for 5 hours under heating at 80° C. After the sulfated zirconia had been filtered off, a low-boiling fraction was removed at 130° C. under vacuum, to yield 780 g of a methylhydrogensiloxane-methylphenylsiloxane-dimethylsiloxane copolymer (synthetic silicone compound) having a weight average molecular weight of 6600 and a Si—H group content of 7.93 mmol/g.

In a reaction vessel equipped with a reflux condenser, a thermometer and a stirrer, 40 g of the above-described synthetic silicone compound was placed and heated to 80° C. under stirring. Into the reaction vessel, a mixed solution prepared by mixing 200 g of UNIOX PKA-5118 [trade name for polyoxyethyleneallyl methyl ether (manufactured by NOF Corp.), weight average molecular weight: 800], 200 g of dehydrated methyl ethyl ketone and 1.0 g of a 5% by mass isopropanol solution of chloroplatinic acid hexahydrate was added under stirring over approximately 1 hour, continuously stirred at 80° C. further for 5 hours, and thereafter cooled to room temperature to yield a Si—H group-containing compound solution (1).

To 4 g of the obtained Si—H group-containing compound solution (1), 100 g of water was added to yield a transparent aqueous solution.

Additionally, to 3.97 g of the obtained Si—H group-containing compound solution (1), 8 g of butyl cellosolve was added and mixed, and thereafter 8 ml of a 1N aqueous solution of sodium hydroxide was added, and consequently hydrogen gas was generated; the volume of the generated hydrogen gas was determined to be 15.8 ml at 21° C. The Si—H group content per 1 g of the Si—H group-containing compound solution (1), determined from the produced amount of the hydrogen gas, was found to be 0.16 mmol/g (the Si—H group content was approximately 1.78 mmol/g in terms of a content per 1 g of the synthetic silicone compound).

In a reaction vessel equipped with a reflux condenser, a thermometer and a stirrer, 252.0 g of TKS-203 [trade name for a titanium oxide hydrosol (manufactured by Tayca Corp.), neutral, TiO2 concentration: 19.2% by mass, average crystallite size: 6 nm (as found in Catalog)] and 748.0 g of water were placed, thereafter, into the reaction vessel, 61.1 g of the synthesized Si—H group-containing compound solution (1) was added at 40° C. under stirring over approximately 30 minutes and further continuously stirred at 40° C. for 12 hours, thereafter methyl ethyl ketone was removed by distillation under reduced pressure, and then water was added to the reaction mixture to yield a 8.3% by mass modified photocatalyst hydrosol (A-1) extremely satisfactory in dispersiveness. In this case, the amount of the hydrogen gas generated by the reaction of the Si—H group-containing compound solution (1) was found at 20° C. to be 160 ml.

Additionally, the particle size distribution of the obtained modified photocatalyst (D-1) thus obtained was monodisperse (number average particle size: 75 nm), and further the monodisperse particle size distribution (number average particle size: 12 nm) of the TKS 203 before the modification treatment was found to be shifted toward a larger particle size.

Referential Example 9

Synthesis of Modified Photocatalyst (D-2)

In a reaction vessel equipped with a reflux condenser, a thermometer and a stirrer, 100 g of a silica-coated titanium oxide hydrosol (trade name: TSK-5, manufactured by Ishihara Sangyo Kaisha Ltd., solid content: 30%), 100 g of ion-exchanged water and 1 g of 3,3,3-trifluoropropyltrimethoxysilane were placed, heated to 80° C. under stirring, and continuously stirred for approximately 2 hours under the condition that the temperature inside the reaction vessel was 80° C., and then cooled to room temperature.

Example 1

With 100 g of the polymer emulsion particle (B-1) water dispersion synthesized in Referential Example 1, 100 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-1).

On a 10 cm×10 cm piece of PET film, the aqueous organic-inorganic hybrid composition (E-1) was bar-coated in a thickness of 2 µm, and thereafter dried at room temperature for 1 week to prepare a test plate (G-1) having an organic-inorganic hybrid substance coating film (F-1).

The pencil hardness and the water contact angle of the obtained test plate (G-1) having the organic-inorganic hybrid substance coating film were found to be HB and 18°, respectively. The transparency of the obtained test plate (G-1) was found to be satisfactory to give a haze value of 1.5 and a total light transmittance of 99%.

The obtained test plate (G-1) having the organic-inorganic hybrid substance coating film was found to give a transparency after a water resistance test such that the haze value was 2.0 and to exhibit a satisfactory water resistance.

Additionally, the stain resistance evaluation results of the obtained test plate (G-1) were such that no staining was found and an extremely satisfactory stain resistance was exhibited. Further, the obtained test plate (G-1) after a weather resistance test was found to give a transparency such that a haze value was 2.5 and to give a water contact angle of 35°.

Example 2

With 100 g of the polymer emulsion particle (B-2) water dispersion synthesized in Referential Example 2, 100 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-2).

On a 10 cm×10 cm piece of PET film, the aqueous organic-inorganic hybrid composition (E-2) was bar-coated in a thickness of 2 µm, and thereafter dried at room temperature for 1 week to prepare a test plate (G-2) having an organic-inorganic hybrid substance coating film (F-2).

The pencil hardness and the water contact angle of the obtained test plate (G-2) having the organic-inorganic hybrid substance coating film were found to be HB and 20°, respectively. The transparency of the obtained test plate (G-2) was found to give a haze value of 2.6 and a total light transmittance of 99%.

The obtained test plate (G-2) having the organic-inorganic hybrid substance coating film was found to give a transparency after a water resistance test such that the haze value was 3.0 and to exhibit a satisfactory water resistance.

Additionally, the stain resistance evaluation results of the obtained test plate (G-2) were such that no staining was found and an extremely satisfactory stain resistance was exhibited. Further, the obtained test plate (G-2) after a weather resistance test was found to give a transparency such that a haze value was 3.8 and to give a water contact angle of 38°.

Example 3

With 100 g of the polymer emulsion particle (B-1) water dispersion synthesized in Referential Example 1, 10 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-3).

On a 10 cm×10 cm piece of PET film, the aqueous organic-inorganic hybrid composition (E-3) was bar-coated in a thickness of 2 µm, and thereafter dried at room temperature for 1 week to prepare a test plate (G-3) having an organic-inorganic hybrid substance coating film (F-3).

The pencil hardness and the water contact angle of the obtained test plate (G-3) having the organic-inorganic hybrid substance coating film were found to be HB and 28°, respectively. The transparency of the obtained test plate (G-3) was found to give a haze value of 3.2 and a total light transmittance of 99%.

The obtained test plate (G-3) having the organic-inorganic hybrid substance coating film was found to give a transparency after a water resistance test such that the haze value was 9.1.

Additionally, the stain resistance evaluation results of the obtained test plate (G-3) were such that some staining was found, but a satisfactory stain resistance was exhibited. Further, the obtained test plate (G-3) after a weather resistance test was found to give a transparency such that a haze value was 11.8 and to give a water contact angle of 46°.

Example 4

With 100 g of the polymer emulsion particle (B-3) water dispersion synthesized in Referential Example 3, 100 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-4).

On a 10 cm×10 cm piece of PET film, the aqueous organic-inorganic hybrid composition (E-4) was bar-coated in a thickness of 2 µm, and thereafter dried at room temperature for 1 week to prepare a test plate (G-4) having an organic-inorganic hybrid substance coating film (F-4).

The pencil hardness and the water contact angle of the obtained test plate (G-4) having the organic-inorganic hybrid substance coating film were found to be HB and 24°, respectively. The transparency of the obtained test plate (G-4) was found to be satisfactory to give a haze value of 1.6 and a total light transmittance of 99%.

The obtained test plate (G-4) having the organic-inorganic hybrid substance coating film was found to give a transparency after a water resistance test such that the haze value was 8.0.

Additionally, the stain resistance evaluation results of the obtained test plate (G-4) were such that some staining was found, but a satisfactory stain resistance was exhibited. Further, the obtained test plate (G-4) after a weather resistance test was found to give a transparency such that a haze value was 11.0 and to give a water contact angle of 40°.

Example 5

With 100 g of the polymer emulsion particle (B-4) water dispersion synthesized in Referential Example 4, 100 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-5).

On a 10 cm×10 cm piece of PET film, the aqueous organic-inorganic hybrid composition (E-5) was bar-coated in a thickness of 2 μm, and thereafter dried at room temperature for 1 week to prepare a test plate (G-5) having an organic-inorganic hybrid substance coating film (F-5).

The pencil hardness and the water contact angle of the obtained test plate (G-5) having the organic-inorganic hybrid substance coating film were found to be B and 22°, respectively. The transparency of the obtained test plate (G-5) was found to be satisfactory to give a haze value of 1.5 and a total light transmittance of 99%.

The obtained test plate (G-5) having the organic-inorganic hybrid substance coating film was found to give a transparency after a water resistance test such that the haze value was 7.5 and to exhibit a satisfactory water resistance.

Additionally, the stain resistance evaluation results of the obtained test plate (G-5) were such that no staining was found and an extremely satisfactory stain resistance was exhibited. Further, the obtained test plate (G-5) after a weather resistance test was found to give a transparency such that a haze value was 7.9 and to give a water contact angle of 33°.

Example 6

With 100 g of the polymer emulsion particle (B-5) water dispersion synthesized in Referential Example 5, 100 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-6).

On a 10 cm×10 cm piece of PET film, the aqueous organic-inorganic hybrid composition (E-6) was bar-coated in a thickness of 2 μm, and thereafter dried at room temperature for 1 week to prepare a test plate (G-6) having an organic-inorganic hybrid substance coating film (F-6).

The pencil hardness and the water contact angle of the obtained test plate (G-6) having the organic-inorganic hybrid substance coating film were found to be HB and 8°, respectively. The transparency of the obtained test plate (G-6) was found to be satisfactory to give a haze value of 0.1 and a total light transmittance of 100%.

The obtained test plate (G-6) having the organic-inorganic hybrid substance coating film was found to give a transparency after a water resistance test such that the haze value was 0.2 and to exhibit a satisfactory water resistance.

Additionally, the stain resistance evaluation results of the obtained test plate (G-6) were such that no staining was found and an extremely satisfactory stain resistance was exhibited. Further, the obtained test plate (G-6) after a weather resistance test was found to give a transparency such that a haze value was 0.5 and to give a water contact angle of 15°.

FIGS. 1A and 1B show the results of an observation of a section of the coating film of the obtained test plate (G-6), carried out with a TEM. As can be observed from these figures, the organic-inorganic hybrid substance coating film (F-6) is an organic-inorganic hybrid substance in which the colloidal silica particles and the shell phase of the polymer emulsion particle (B-5) form a continuous layer under the condition that the colloidal silica particles and the shell phase interact with each other, and in which the particle-like core phase of the polymer emulsion particle (B-5) is present in the continuous layer.

Example 7

With 100 g of the polymer emulsion particle (B-1) water dispersion synthesized in Referential Example 1, 30 g of a water-dispersed colloidal silica (trade name: SNOWTEX O, manufactured by Nissan Chemical Industries, Ltd., solid content: 20%) having a number average particle size of 12 nm and 20 g of a silica-coated titanium oxide hydrosol (trade name: MPT-422, manufactured by Ishihara Sangyo Kaisha Ltd., solid content: 20%) having a number average particle size of 10 nm were mixed, and the mixture thus obtained was stirred to prepare an aqueous organic-inorganic hybrid composition (E-7).

On a 10 cm×10 cm piece of glass plate, the aqueous organic-inorganic hybrid composition (E-7) was bar-coated in a thickness of 2 μm, and thereafter dried at room temperature for 1 week to prepare a test plate (G-7) having an organic-inorganic hybrid substance coating film (F-7).

The pencil hardness and the water contact angle of the obtained test plate (G-7) having the organic-inorganic hybrid substance coating film were found to be HB and 12°, respectively. The transparency of the obtained test plate (G-7) was found to be satisfactory to give a haze value of 1.2 and a total light transmittance of 99%.

The obtained test plate (G-7) having the organic-inorganic hybrid substance coating film was found to give a transparency after a water resistance test such that the haze value was 1.5 and to exhibit a satisfactory water resistance.

The obtained test plate (G-7) having the organic-inorganic hybrid substance coating film was found to give a water contact angle of 3° after ultraviolet light (from a black light) irradiation. Further, in this case, the pencil hardness of the test plate (G-7) was found to be H, and the photocatalytic activity evaluation results of the test plate (G-7) were satisfactory (○).

Additionally, the stain resistance evaluation results of the obtained test plate (G-7) were such that no staining was found and an extremely satisfactory stain resistance was exhibited. Further, the obtained test plate (G-7) after a weather resistance test was found to give a transparency such that a haze value was 1.8 and to give a water contact angle of 5°.

Example 8

With 100 g of the polymer emulsion particle (B-1) water dispersion synthesized in Referential Example 1, 30 g of a water-dispersed colloidal silica (trade name: SNOWTEX O, manufactured by Nissan Chemical Industries, Ltd., solid content: 20%) having a number average particle size of 12 nm and 20 g of a silica-coated titanium oxide hydrosol (trade name: TSK-5, manufactured by Ishihara Sangyo Kaisha Ltd., solid content: 30%) having a number average particle size of 10 nm were mixed, and the mixture thus obtained was stirred to prepare an aqueous organic-inorganic hybrid composition (E-8).

On a 10 cm×10 cm piece of PET film, the aqueous organic-inorganic hybrid composition (E-8) was bar-coated in a thickness of 2 μm, and thereafter dried at room temperature for 1 week to prepare a test plate (G-8) having an organic-inorganic hybrid substance coating film (F-8).

The pencil hardness and the water contact angle of the obtained test plate (G-8) having the organic-inorganic hybrid substance coating film were found to be HB and 15°, respectively. The transparency of the obtained test plate (G-8) was found to be satisfactory to give a haze value of 1.1 and a total light transmittance of 99%.

The obtained test plate (G-8) having the organic-inorganic hybrid substance coating film was found to give a transparency after a water resistance test such that the haze value was 1.5 and to exhibit a satisfactory water resistance.

The obtained test plate (G-8) having the organic-inorganic hybrid substance coating film was found to give a water contact angle of 12° after ultraviolet light (from a black light) irradiation. Further, in this case, the pencil hardness of the test plate (G-8) was found to be HB, and the photocatalytic activity evaluation results of the test plate (G-8) were good (○).

Additionally, the stain resistance evaluation results of the obtained test plate (G-8) were such that no staining was found and an extremely satisfactory stain resistance was exhibited. Further, the obtained test plate (G-8) after a weather resistance test was found to give a transparency such that a haze value was 18.2 and to give a water contact angle of 18°.

Example 9

With 100 g of the polymer emulsion particle (B-1) water dispersion synthesized in Referential Example 1, 30 g of a water-dispersed colloidal silica (trade name: SNOWTEX O, manufactured by Nissan Chemical Industries, Ltd., solid content: 20%) having a number average particle size of 12 nm and 20 g the modified photocatalyst (D-1) synthesized in Referential Example 8 were mixed, and the mixture thus obtained was stirred to prepare an aqueous organic-inorganic hybrid composition (E-9).

On a 10 cm×10 cm piece of glass plate, the aqueous organic-inorganic hybrid composition (E-9) was bar-coated in a thickness of 2 μm, and thereafter dried at room temperature for 1 week to prepare a test plate (G-9) having an organic-inorganic hybrid substance coating film (F-9).

The pencil hardness and the water contact angle of the obtained test plate (G-9) having the organic-inorganic hybrid substance coating film were found to be HB and 13°, respectively. The transparency of the obtained test plate (G-9) was found to be satisfactory to give a haze value of 1.1 and a total light transmittance of 99%.

The obtained test plate (G-9) having the organic-inorganic hybrid substance coating film was found to give a transparency after a water resistance test such that the haze value was 1.3 and to exhibit a satisfactory water resistance.

The obtained test plate (G-9) having the organic-inorganic hybrid substance coating film was found to give a water contact angle of 4° after ultraviolet light (from a black light) irradiation. Further, in this case, the pencil hardness of the test plate (G-9) was found to be H, and the photocatalytic activity evaluation results of the test plate (G-9) were excellent ◉.

Additionally, the stain resistance evaluation results of the obtained test plate (G-9) were such that no staining was found and an extremely satisfactory stain resistance was exhibited. Further, the obtained test plate (G-9) after a weather resistance test was found to give a transparency such that a haze value was 1.8 and to give a water contact angle of 6°.

Example 10

With 100 g of the polymer emulsion particle (B-1) water dispersion synthesized in Referential Example 1, 30 g of a water-dispersed colloidal silica (trade name: SNOWTEX O, manufactured by Nissan Chemical Industries, Ltd., solid content: 20%) having a number average particle size of 12 nm and 20 g the modified photocatalyst (D-2) synthesized in Referential Example 9 were mixed, and the mixture thus obtained was stirred to prepare an aqueous organic-inorganic hybrid composition (E-10).

On a 10 cm×10 cm piece of PET film, the aqueous organic-inorganic hybrid composition (E-10) was bar-coated in a thickness of 2 μm, and thereafter dried at room temperature for 1 week to prepare a test plate (G-10) having an organic-inorganic hybrid substance coating film (F-10).

The pencil hardness and the water contact angle of the obtained test plate (G-10) having the organic-inorganic hybrid substance coating film were found to be HB and 13°, respectively. The transparency of the obtained test plate (G-10) was found to be satisfactory to give a haze value of 1.2 and a total light transmittance of 99%.

The obtained test plate (G-10) having the organic-inorganic hybrid substance coating film was found to give a transparency after a water resistance test such that the haze value was 1.3 and to exhibit a satisfactory water resistance.

The obtained test plate (G-10) having the organic-inorganic hybrid substance coating film was found to give a water contact angle of 11° after ultraviolet light (from a black light) irradiation. Further, in this case, the pencil hardness of the test plate (G-10) was found to be H, and the photocatalytic activity evaluation results of the test plate (G-10) were excellent ◉.

Additionally, the stain resistance evaluation results of the obtained test plate (G-10) were such that no staining was found and an extremely satisfactory stain resistance was exhibited. Further, the obtained test plate (G-10) after a weather resistance test was found to give a transparency such that a haze value was 1.9 and to give a water contact angle of 3°.

A section of the coating film of the obtained test plate (G-10) was observed with a TEM, and consequently it was observed that the number of the needle-like modified photocatalyst (D-2) particles present on the coating film surface is far larger than the number of the needle-like modified photocatalyst (D-2) particles present in the interface with the piece of PET film.

Example 11

With 100 g of the polymer emulsion particle (B-5) water dispersion synthesized in Referential Example 5, 33 g of a conductive metal oxide water dispersion, namely, a Sb-doped SnO2 water dispersion (trade name: SN-100D, manufactured by Ishihara Sangyo Kaisha Ltd., solid content: 30%) having a number average particle size of 20 nm was mixed, and the mixture thus obtained was stirred to prepare an aqueous organic-inorganic hybrid composition (E-11).

On a 10 cm×10 cm piece of PET film, the aqueous organic-inorganic hybrid composition (E-11) was bar-coated in a thickness of 2 μm, and thereafter dried at 80° C. for 1 hour to prepare a test plate (G-11) having an organic-inorganic hybrid substance coating film (F-11).

The surface resistance of the obtained test plate (G-11) having the organic-inorganic hybrid substance coating film was found to be $3.5×10^7 Ω/□$ and the transparency of the obtained test plate (G-11) was such that a haze value was 5.1 and a total light transmittance was 93%.

Comparative Example 1

With 100 g of the polymer emulsion particle (B-6) water dispersion synthesized in Referential Example 6, 50 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-12) with some precipitate observed.

On a 10 cm×10 cm piece of PET film, the aqueous organic-inorganic hybrid composition (E-12) was bar-coated in a thickness of 2 μm, and thereafter dried at room temperature for 1 week to prepare a test plate (G-12) having an organic-inorganic hybrid substance coating film (F-12).

The pencil hardness and the water contact angle of the obtained test plate (G-12) having the organic-inorganic hybrid substance coating film were found to be B and 38°, respectively. The transparency of the obtained test plate (G-12) was found to be unsatisfactory to give a haze value of 18.0 and a total light transmittance of 85%.

The obtained test plate (G-12) having the organic-inorganic hybrid substance coating film was found to give a transparency after a water resistance test such that the haze value was 30.5 and to result in a poor water resistance.

Comparative Example 2

On a 10 cm×10 cm piece of PET film, 100 g of the polymer emulsion particle (B-1) water dispersion synthesized in Referential Example 1 was bar-coated in a thickness of 2 μm, and thereafter dried at room temperature for 1 week to prepare a test plate (G-13) having an organic-inorganic hybrid substance coating film (F-13).

The pencil hardness and the water contact angle of the obtained test plate (G-13) having the organic-inorganic hybrid substance coating film were found to be 5B and 78°, respectively. The transparency of the obtained test plate (G-13) was found to be unsatisfactory to give a haze value of 9.5 and a total light transmittance of 92%.

The obtained test plate (G-13) having the organic-inorganic hybrid substance coating film was found to give a transparency after a water resistance test such that the haze value was 22.0 and to results in a poor water resistance.

Additionally, the stain resistance evaluation results of the obtained test plate (G-13) were such that rain streak stain was found and poor results were obtained.

Comparative Example 3

With 100 g of the polymer emulsion particle (B-7) water dispersion synthesized in Referential Example 7, 45 g of a water-dispersed colloidal silica (trade name: SNOWTEX O, manufactured by Nissan Chemical Industries, Ltd., solid content: 20%) having a number average particle size of 12 nm was mixed, and the mixture thus obtained was stirred to prepare an aqueous organic-inorganic hybrid composition (E-14).

On a 10 cm×10 cm piece of PET film, the aqueous organic-inorganic hybrid composition (E-14) was bar-coated in a thickness of 2 μm, and thereafter dried at room temperature for 1 week to prepare a test plate (G-14) having an organic-inorganic hybrid substance coating film (F-14).

The pencil hardness and the water contact angle of the obtained test plate (G-14) having the organic-inorganic hybrid substance coating film were found to be 6B or softer and 38°, respectively. The transparency of the obtained test plate (G-14) was found to be unsatisfactory to give a haze value of 22.0 and a total light transmittance of 84%.

The water resistance test of the obtained test plate (G-14) having the organic-inorganic hybrid substance coating film resulted in peeling off of the organic-inorganic hybrid substance coating film (F-14) and also in a poor water resistance.

INDUSTRIAL APPLICABILITY

The aqueous organic-inorganic hybrid composition provided by the present invention, capable of forming an organic-inorganic hybrid substance to develop high levels of weather resistance, stain resistance and transparency is useful as coating agents for building exterior, outer package marking, automobiles, displays, lenses and the like.

DESCRIPTION OF REFERENCE NUMERALS

Figure 1A:
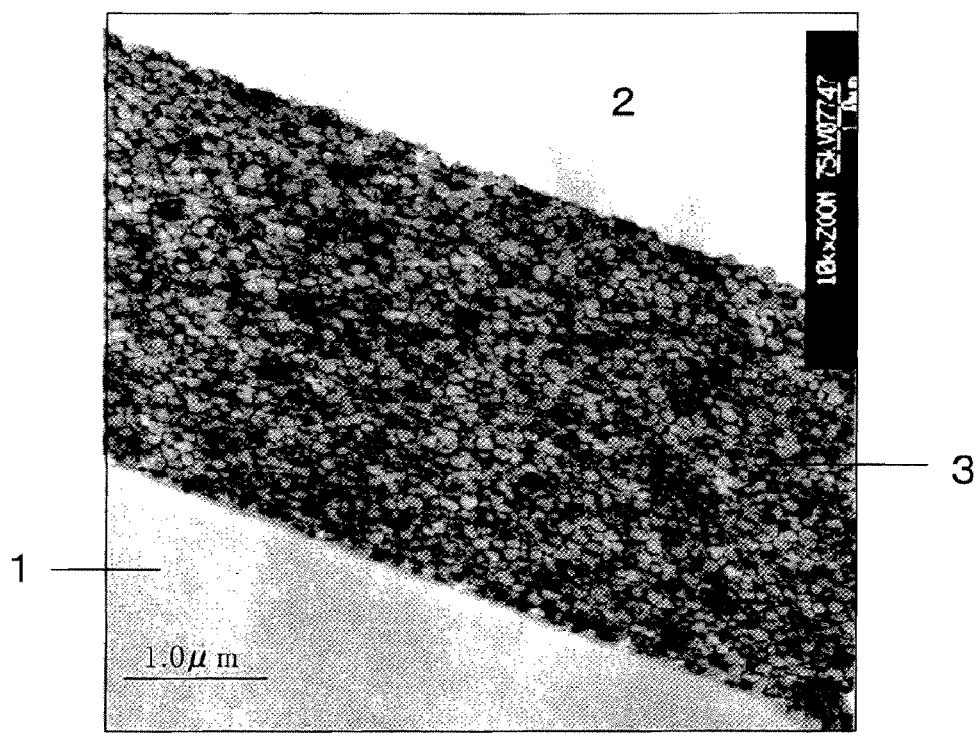
FIG. 1A is a TEM microgram of a section of the coating film of a test plate obtained in Example 6.
Figure 1B:
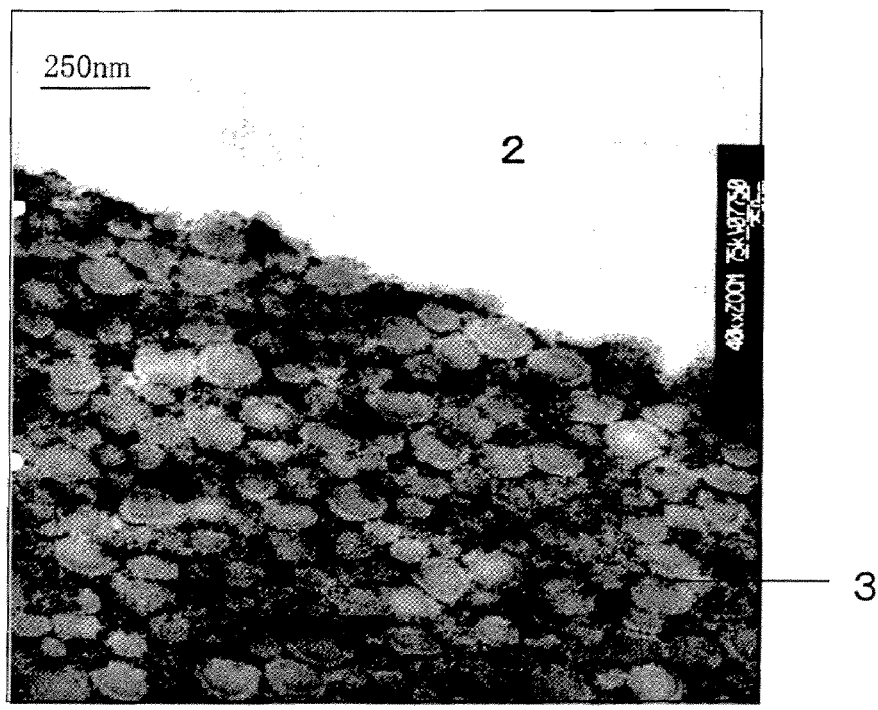
FIG. 1B is another TEM microgram of a section of the coating film of the test plate obtained in Example 6.

1 PET film
2 Embedding epoxy resin
3 Organic-inorganic hybrid substance coating film

The invention claimed is:

1. An aqueous organic-inorganic hybrid composition characterized by comprising:
   a metal oxide (A) having a particle size of 1 to 400 nm; and
   a polymer emulsion particle (B) having a particle size of 10 to 800 nm, obtained by polymerizing a hydrolyzable silicon compound (b1) and a diethyl acrylamide monomer in the presence of water and an emulsifier,
   wherein the amount of the diethyl acrylamide monomer (b2) used for obtaining the polymer emulsion particle (B) is 0.07 or more and 0.5 or less in terms of a mass ratio (b2)/(B) of the diethyl acrylamide monomer to the polymer emulsion particle (B) to be obtained.

2. The aqueous organic-inorganic hybrid composition according to claim 1, wherein the mass ratio (b2)/(B) is 0.1 or more and 0.5 or less.

3. The aqueous organic-inorganic hybrid composition according to claim 2, wherein a mass ratio (b2)/(A) of the diethyl acrylamide monomer used for obtaining the polymer emulsion particle (B) to the metal oxide (A) is 0.1 or more and 1.0 or less.

4. The aqueous organic-inorganic hybrid composition according to claim 1, wherein the polymer emulsion particle (B) is a core/shell structure formed of two or more layers.

5. The aqueous organic-inorganic hybrid composition according to claim 1, wherein the polymer emulsion particle (B) is a core/shell structure, a mass ratio (b2)/(b1) of the diethyl acrylamide monomer to the hydrolyzable silicon compound (b1) in an innermost layer of the core/shell structure is 1.0 or less, and the mass ratio (b2)/(b1) in an outermost layer is 0.1 or more and 5.0 or less.

6. The aqueous organic-inorganic hybrid composition according to claim 1, wherein the polymer emulsion particle (B) is obtained by polymerizing the hydrolyzable silicon compound (b1) and the diethyl acrylamide monomer in the presence of a seed particle which is obtained by polymerizing the diethyl acrylamide monomer and/or an additional vinyl monomer (b3) copolymerizable with the monomer (b2) and/or the hydrolyzable silicon compound (b1) in the presence of water and an emulsifier.

7. The aqueous organic-inorganic hybrid composition according to claim 1, wherein the polymer emulsion particle (B) is obtained by polymerizing the hydrolyzable silicon compound (b1) and the diethyl acrylamide monomer in the presence of a seed particle which is obtained by polymerizing the hydrolyzable silicon compound (b1) in the presence of water and an emulsifier.

8. The aqueous organic-inorganic hybrid composition according to claim 1, wherein the hydrolyzable silicon compound (b1) comprises at least one vinyl polymerizable group-containing hydrolyzable silicon compound, and an amount of the hydrolyzable silicon compound (b1) is 0.01 part by mass or more and 20 parts by mass or less in relation to 100 parts by mass of the polymer emulsion particle (B).

9. The aqueous organic-inorganic hybrid composition according to claim 1, wherein the hydrolyzable silicon compound (b1) comprises at least one vinyl polymerizable group-containing hydrolyzable silicon compound, and a used amount of the hydrolyzable silicon compound (b1) is 0.1 part by mass or more and 100 parts by mass of the diethyl acrylamide monomer.

10. The aqueous organic-inorganic hybrid composition according to claim 1, wherein the metal oxide (A) is at least one selected from the group consisting of silicon dioxide, a photocatalytically active metal oxide and a conductive metal oxide.

11. The aqueous organic-inorganic hybrid composition according claim 1, characterized by comprising a modified metal oxide (A') obtained by modifying the metal oxide (A) with at least one modifier compound selected from compounds containing at least one structure unit selected from the group consisting of a triorganosilane unit represented by formula (1), a monooxydiorganosilane unit represented by formula (2), a dioxyorganosilane unit represented by formula (3), a trioxysilane unit represented by formula (4) and a difluoromethylene unit:

$$R_3Si— \quad (1)$$

wherein Rs are each independently a linear or branched alkyl group having 1 to 30 carbon atoms, a cycloalkyl group having 5 to 20 carbon atoms, a linear or branched fluoroalkyl group having 1 to 30 carbon atoms, a linear or branched alkenyl group having 2 to 30 carbon atoms, a phenyl group, an alkoxy group having 1 to 20 carbon atoms or a hydroxyl group, $$—(R_2SiO)— \quad (2)$$

wherein Rs are defined in the same manner as in formula (1),

[Formula 1]

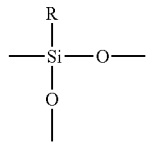
(3)

wherein R is defined in the same manner as in formula (1),

[Formula 2]

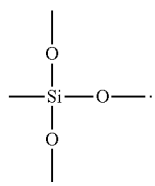
(4)

12. The aqueous organic-inorganic hybrid composition according to claim 11, wherein the metal oxide is a photocatalytically active metal oxide.

13. The aqueous organic-inorganic hybrid composition according to claim 10, wherein a ratio (l/d) of a particle length (l) to a particle diameter (d) of the photocatalytically active metal oxide is 1/1 to 20/1.

14. The aqueous organic-inorganic hybrid composition according to claim 1, comprising an alcohol.

15. An organic-inorganic hybrid substance formed of the aqueous organic-inorganic hybrid composition of claim 1.

16. An organic-inorganic hybrid substance comprising the aqueous organic-inorganic hybrid composition of claim 1.

17. The organic-inorganic hybrid substance according to claim 15, wherein a continuous layer is formed under a condition that the metal oxide (A) and a shell phase interact with each other, and a particle-like core phase is present in the continuous layer.

18. The organic-inorganic hybrid substance according to claim 15, wherein a water contact angle at 23° C. is 30° or less.

19. A functional hybrid article comprising the organic-inorganic hybrid substance of claim 15 on a substrate.

20. A functional hybrid article which comprises on a substrate the organic-inorganic hybrid substance formed of the aqueous organic-inorganic hybrid composition of claim 11, the functional hybrid article being characterized in that:
a concentration of the modified metal oxide (A') in the organic-inorganic hybrid substance is higher on an exposed side of the organic-inorganic hybrid substance than on another side in contact with the substrate of the organic-inorganic hybrid substance.

21. A functional hybrid article for building exterior comprising on a substrate the organic-inorganic hybrid substance of claim 15.

22. A functional hybrid article for outer package marking comprising on a resin substrate the organic-inorganic hybrid substance of claim 15.

* * * * *